United States Patent
Peng et al.

(10) Patent No.: US 12,413,533 B2
(45) Date of Patent: Sep. 9, 2025

(54) METHOD, COMMUNICATION DEVICE, APPARATUS, AND STORAGE MEDIUM FOR MEASURING AND FEEDING BACK DELAY INFORMATION

(71) Applicant: DATANG MOBILE COMMUNICATIONS EQUIPMENT CO., LTD., Beijing (CN)

(72) Inventors: Ying Peng, Beijing (CN); Yan Wang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 18 days.

(21) Appl. No.: 18/270,923

(22) PCT Filed: Dec. 28, 2021

(86) PCT No.: PCT/CN2021/141968
§ 371 (c)(1),
(2) Date: Jul. 5, 2023

(87) PCT Pub. No.: WO2022/148270
PCT Pub. Date: Jul. 14, 2022

(65) Prior Publication Data
US 2023/0403239 A1    Dec. 14, 2023

(30) Foreign Application Priority Data
Jan. 5, 2021   (CN) .......................... 202110008128.2

(51) Int. Cl.
*H04L 47/56* (2022.01)
*H04L 47/10* (2022.01)
(Continued)

(52) U.S. Cl.
CPC .............. *H04L 47/56* (2013.01); *H04L 47/26* (2013.01); *H04L 47/29* (2013.01); *H04L 47/323* (2013.01)

(58) Field of Classification Search
CPC ......... H04L 47/56; H04L 47/26; H04L 47/29; H04L 47/323; H04L 47/283
(Continued)

(56) References Cited

U.S. PATENT DOCUMENTS

| 2014/0219162 A1* | 8/2014 | Eyuboglu | H04L 45/745 370/315 |
| 2014/0337473 A1* | 11/2014 | Frusina | H04N 21/6377 709/217 |

(Continued)

FOREIGN PATENT DOCUMENTS

| CN | 1956593 A | 5/2007 |
| CN | 106452972 A | 2/2017 |

(Continued)

*Primary Examiner* — Karen C Tang
(74) *Attorney, Agent, or Firm* — Meunier Carlin & Curfman LLC

(57) ABSTRACT

A method, a communication device, an apparatus, and a storage medium for measuring and feeding back delay information. The method comprises: receiving, by a reception terminal, a physical layer signal or channel that is transmitted by a transmission terminal and carries clock reference information corresponding to a service to be transmitted, wherein the clock reference information represents reference arrival time of the service to be transmitted to the reception terminal; demodulating, by the reception terminal, the physical layer signal or channel, obtaining, by the reception terminal, the clock reference information, and determining, by the reception terminal, corresponding delay information at least based on the clock reference information and actual arrival time of the physical layer signal or
(Continued)

channel; and feeding back, by the reception terminal, the delay information to a target terminal.

12 Claims, 11 Drawing Sheets

(51) Int. Cl.
*H04L 47/26* (2022.01)
*H04L 47/32* (2022.01)

(58) Field of Classification Search
USPC .......................................................... 709/224
See application file for complete search history.

(56) References Cited

U.S. PATENT DOCUMENTS

| | | | | |
|---|---|---|---|---|
| 2017/0289000 | A1* | 10/2017 | Park | G06F 11/3058 |
| 2019/0342874 | A1* | 11/2019 | Davydov | H04W 72/23 |
| 2020/0259896 | A1* | 8/2020 | Sachs | H04W 56/0065 |
| 2021/0037250 | A1* | 2/2021 | Makar | H04N 19/107 |
| 2021/0099226 | A1* | 4/2021 | Delaruelle | H04B 17/364 |
| 2021/0120600 | A1* | 4/2021 | Park | H04W 76/34 |
| 2021/0120625 | A1* | 4/2021 | Park | H04W 4/40 |
| 2022/0021723 | A1* | 1/2022 | Oyman | H04L 65/1069 |
| 2022/0167209 | A1* | 5/2022 | Baek | H04W 28/02 |
| 2023/0337225 | A1* | 10/2023 | Alfarhan | H04W 72/232 |
| 2023/0354386 | A1* | 11/2023 | Hui | H04W 72/20 |
| 2023/0361842 | A1* | 11/2023 | Hajri | H04B 7/0639 |
| 2024/0007944 | A1* | 1/2024 | Faxén | H04W 48/20 |

FOREIGN PATENT DOCUMENTS

| | | |
|---|---|---|
| CN | 108632105 A | 10/2018 |
| CN | 111162971 A | 5/2020 |
| JP | 2009218696 A | 9/2009 |

* cited by examiner

METHOD, COMMUNICATION DEVICE, APPARATUS, AND STORAGE MEDIUM FOR MEASURING AND FEEDING BACK DELAY INFORMATION

CROSS REFERENCE TO RELATED APPLICATION

The present application is a National Stage of International Application No. PCT/CN2021/141968, filed on Dec. 28, 2021, which claims the priority to Chinese Patent Application No. 202110008128.2, filed with China National Intellectual Property Administration on Jan. 5, 2021, both of which are incorporated herein in their entirety by reference.

TECHNICAL FIELD

The present disclosure relates to the technical field of communications, in particular to a method, communication device, apparatus and a storage medium for measuring and feeding back delay information.

BACKGROUND

Quality of service (QoS) is used for evaluating a capacity of a service provider to satisfy service requirements from a customer. The Qos is configured to regulate network traffic of enterprises, manage and avoid network congestion, and reduce a packet loss rate of data during transmission accordingly. In general, The Qos includes a service type, a default priority level, a packet delay budget, a packet loss rate of data, maximum data burst traffic, etc., and can be improved by avoiding the network congestion, shortening a transmission delay and reducing the packet loss rate of data.

In the current 5th generation (5G) communication system, a priority level in a queuing process of a protocol stack or a scheduling mechanism is mainly determined based on 5G QoS feature parameter information, and resource scheduling of a media access control (MAC) layer is optimized according to different service types based on the priority level. Specifically, in the queuing process of the protocol stack or the scheduling mechanism, the 5G QoS feature parameter information is comprehensively considered to determine priority of user data and assist resource scheduling in the MAC layer. The 5G QoS feature parameter information includes a resource type, a priority level, a packet delay budget, a packet loss rate, maximum data burst traffic, etc.

Currently, in a communication system of 5G or before 5G, delay measurement mainly satisfies the demand of minimization of drive tests. Since the packet delay budget in the 5G QoS feature parameter information is a preset delay, and there is no real-time measurement and feedback mechanism for delay information in data transmission, delay information for a specific service cannot be measured in real time, subsequent service data and transmission cannot be reasonably scheduled in time, so as to aggravate scheduling congestion and prolong a delay of terminal-to-terminal data transmission. Besides, in the existing 5G communication system, it is impossible to obtain, through actual measurement, delay information of user data suffering packet loss due to overtime, etc.

In view of this, it is necessary to design a new technical solution to overcome the above defects.

SUMMARY

The present disclosure provides a method, communication device, apparatus and a storage medium for measuring and feeding back delay information, which are used for relieving scheduling congestion, shortening a terminal-to-terminal delay and introducing a real-time mechanism for measuring and feeding back delay information into a protocol stack or a scheduling mechanism.

A specific technical solution according to an embodiment of the present disclosure is as follows.

In a first aspect, a method for measuring and feeding back delay information is provided. The method includes: receiving, by a reception terminal, a physical layer signal or channel that is transmitted by a transmission terminal and carries clock reference information corresponding to a service to be transmitted, where the clock reference information represents reference arrival time of the service to be transmitted to the reception terminal; demodulating, by the reception terminal, the physical layer signal or channel, obtaining, by the reception terminal, the clock reference information, and determining, by the reception terminal, corresponding delay information at least based on the clock reference information and actual arrival time of the physical layer signal or channel; and feeding back, by the reception terminal, the delay information to a target terminal.

Optionally, the clock reference information corresponding to the service to be transmitted includes any one of expression forms as follows: an interval determined based on absolute time and a first allowable value corresponding to the service to be transmitted; an interval determined based on a subframe sequence number and a second allowable value corresponding to the service to be transmitted; or an interval determined based on a delay budget and a third allowable value corresponding to the service to be transmitted, where under a condition that the clock reference information is expressed as the delay budget, the physical layer signal or channel further carries start transmission time of the physical layer signal or channel, and the delay information is determined based on the clock reference information, the start transmission time of the physical layer signal or channel and the actual arrival time of the physical layer signal or channel.

Optionally, the receiving, by the reception terminal, the physical layer signal or channel that is transmitted by the transmission terminal and carries the clock reference information corresponding to the service to be transmitted includes: under a condition that the transmission terminal is a base station, the reception terminal is a terminal and the target terminal is the base station, receiving, by the reception terminal, configuration parameters such as the physical layer signal or channel carrying the clock reference information corresponding to the service to be transmitted and a corresponding delay information feedback period transmitted by the transmission terminal; and the feeding back, by the reception terminal, the delay information to the target terminal includes: feeding back, by the reception terminal, the corresponding delay information determined at least based on the clock reference information and the actual arrival time of the physical layer signal or channel to the target terminal based on the configuration parameter such as the delay information feedback period, etc.

Optionally, the receiving, by the reception terminal, the physical layer signal or channel that is transmitted by the transmission terminal and carries clock reference information corresponding to the service to be transmitted includes: under a condition that the transmission terminal is a first terminal, the reception terminal is a second terminal and the target terminal is the first terminal, receiving, by the reception terminal, configuration parameters such as the physical layer signal or channel carrying the clock reference information corresponding to the service to be transmitted and a corresponding delay information feedback period transmitted by the transmission terminal; and the feeding back, by the reception terminal, the delay information to a target terminal includes: feeding back, by the reception terminal, the corresponding delay information determined at least based on the clock reference information and the actual arrival time of the physical layer signal or channel to the target terminal based on the configuration parameter such as the delay information feedback period, etc.

Optionally, the receiving, by the reception terminal, the physical layer signal or channel that is transmitted by the transmission terminal and carries clock reference information corresponding to the service to be transmitted includes: under a condition that the transmission terminal is a base station, the reception terminal is a second terminal, the target terminal is the base station, the service to be transmitted is transmitted to the base station by the first terminal, and the clock reference information is obtained by demodulating through the base station the physical layer signal or channel transmitted by the first terminal, receiving, by the reception terminal, configuration parameters such as the physical layer signal or channel carrying the clock reference information corresponding to the service to be transmitted and a corresponding delay information feedback period transmitted by the transmission terminal; and the feeding back, by the reception terminal, the delay information to the target terminal includes: feeding back, by the reception terminal, the corresponding delay information determined at least based on the clock reference information and the actual arrival time of the physical layer signal or channel to the target terminal based on the configuration parameter such as the delay information feedback period.

Optionally, the receiving, by the reception terminal, the physical layer signal or channel that is transmitted by the transmission terminal and carries clock reference information corresponding to the service to be transmitted includes: under a condition that the transmission terminal is a first terminal, the reception terminal is a second terminal and the target terminal is a base station, receiving, by the reception terminal, the physical layer signal or channel that is transmitted by the transmission terminal and carries the clock reference information corresponding to the service to be transmitted; and the feeding back, by the reception terminal, the delay information to a target terminal includes: receiving, by the reception terminal, a configuration parameter such as a delay information feedback period transmitted by the target terminal, and feeding back, by the reception terminal, based on the configuration parameter such as the delay information feedback period, the corresponding delay information determined at least based on the clock reference information and the actual arrival time of the physical layer signal or channel to the target terminal.

Optionally, the feeding back, by the reception terminal, the delay information to a target terminal includes: feeding back, by the reception terminal, the delay information to the target terminal directly on an uplink subframe adjacent to a subframe on which the service to be transmitted is received; or, feeding back, by the reception terminal, the delay information to the target terminal according to a period for transmitting service data of the service to be transmitted by the transmission terminal; or, feeding back, by the reception terminal, the delay information to the target terminal based on a preset time interval, where the delay information is an average of corresponding delay information within the time interval; or, under a condition determining that the delay information reaches a preset delay threshold corresponding to the service to be transmitted, feeding back, by the reception terminal, the delay information to the target terminal.

In a second aspect, a method for measuring and feeding back delay information is provided. The method includes: configuring, by a transmission terminal based on a service to be transmitted that is obtained, a physical layer signal or channel carrying clock reference information corresponding to the service to be transmitted, where the clock reference information represents reference arrival time of the service to be transmitted to a reception terminal; and transmitting, by the transmission terminal, the service to be transmitted and the physical layer signal or channel to the reception terminal, to cause the reception terminal to feed back delay information to a target terminal, where the delay information is determined by the reception terminal at least based on the clock reference information and actual arrival time of the physical layer signal or channel.

Optionally, the clock reference information corresponding to the service to be transmitted includes any one of expression forms as follows: an interval determined based on absolute time and a first allowable value corresponding to the service to be transmitted; an interval determined based on a subframe sequence number and a second allowable value corresponding to the service to be transmitted; or an interval determined based on a delay budget and a third allowable value corresponding to the service to be transmitted, where under a condition that the clock reference information is expressed as the delay budget, the physical layer signal or channel further carries start transmission time of the physical layer signal or channel, and the delay information is determined by the reception terminal based on the clock reference information, the start transmission time of the physical layer signal or channel and the actual arrival time of the physical layer signal or channel.

Optionally, the transmitting, by the transmission terminal, the service to be transmitted and the physical layer signal or channel to the reception terminal, to cause the reception terminal to feed back the delay information to the target terminal includes: under a condition that the transmission terminal is a base station, the reception terminal is a terminal and the target terminal is the base station, transmitting, by the transmission terminal, configuration parameters such as the service to be transmitted, the physical layer signal or channel and a corresponding delay information feedback period to the reception terminal, to cause the reception terminal to feed back the delay information to the target terminal based on the configuration parameter such as the delay information feedback period; and under a condition that the transmission terminal is a first terminal, the reception terminal is a second terminal and the target terminal is the first station, transmitting, by the transmission terminal, configuration parameters such as the service to be transmitted, the physical layer signal or channel and a corresponding delay information feedback period to the reception terminal, to cause the reception terminal to feed back the delay information to the target terminal based on the configuration parameter such as the delay information feedback period.

Optionally, the transmitting, by the transmission terminal, the service to be transmitted and the physical layer signal or channel to the reception terminal, to cause the reception terminal to feed back the delay information to the target terminal includes: under a condition that the transmission terminal is a base station, the reception terminal is a second terminal, the target terminal is the base station, the service to be transmitted is transmitted to the base station by the first terminal, and the clock reference information is obtained by demodulating through the base station the physical layer signal or channel transmitted by the first terminal, transmitting, by the transmission terminal, configuration parameters such as the service to be transmitted, the physical layer signal or channel and a corresponding delay information feedback period to the reception terminal, to cause the reception terminal to feed back the delay information to the target terminal based on the configuration parameter such as the delay information feedback period; and under a condition that the transmission terminal is a first terminal, the reception terminal is a second terminal and the target terminal is a base station, transmitting, by the transmission terminal, the service to be transmitted and the physical layer signal or channel to the reception terminal, to cause the reception terminal to receive a configuration parameter such as a delay information feedback period transmitted by the target terminal and feed back the delay information to the target terminal based on the configuration parameter such as the delay information feedback period.

In a third aspect, a method for measuring delay information is provided. The method includes: receiving, by a reception terminal, a service to be transmitted that is transmitted by a transmission terminal, where the service to be transmitted carries clock reference information corresponding to the service to be transmitted, and the clock reference information represents reference arrival time of the service to be transmitted to the reception terminal; and demodulating, by the reception terminal, the service to be transmitted, obtaining the clock reference information, and determining, by the reception terminal, corresponding delay information at least based on the clock reference information and actual arrival time of the service to be transmitted.

Optionally, under a condition that the service to be transmitted is transmitted by the transmission terminal according to a preset period, the clock reference information represents reference arrival time of a first service data packet of the service to be transmitted to the reception terminal and time interval information corresponding to periodic transmission of the service to be transmitted by the transmission terminal.

Optionally, the clock reference information corresponding to the service to be transmitted includes any one of expression forms as follows: an interval determined based on absolute time and a first allowable value corresponding to the service to be transmitted; an interval determined based on a subframe sequence number and a second allowable value corresponding to the service to be transmitted; or an interval determined based on a delay budget and a third allowable value corresponding to the service to be transmitted, where under a condition that the clock reference information is expressed as the delay budget, the service to be transmitted further carries start transmission time of the service to be transmitted, and the delay information is determined based on the clock reference information, the start transmission time of the service to be transmitted and the actual arrival time of the service to be transmitted.

Optionally, the delay information represents any type of information as follows: the delay information represents delay information corresponding to the first service data packet in the service to be transmitted; the delay information represents delay information corresponding to several preset first service data packets in the service to be transmitted; or the delay information represents delay information corresponding to each service data packet in the service to be transmitted.

Optionally, the receiving, by the reception terminal, the service to be transmitted that is transmitted by the transmission terminal includes: under a condition that the transmission terminal is a base station, the reception terminal is a terminal and the target terminal is the base station, receiving, by the reception terminal, configuration parameters such as the service to be transmitted and a corresponding delay information feedback period transmitted by the transmission terminal; and after the demodulating the service to be transmitted, obtaining, by the reception terminal, the clock reference information, and determining, by the reception terminal, corresponding delay information at least based on the clock reference information and actual arrival time of the service to be transmitted, the method further includes: feeding back, by the reception terminal, the corresponding delay information determined to the target terminal based on the configuration parameter such as the delay information feedback period.

Optionally, the receiving, by the reception terminal, the service to be transmitted that is transmitted by the transmission terminal includes: under a condition that the transmission terminal is a first terminal, the reception terminal is a second terminal and the target terminal is a base station, receiving, by the reception terminal, the service to be transmitted that is transmitted by the transmission terminal; and after the demodulating, by the reception terminal, the service to be transmitted, obtaining the clock reference information, and determining, by the reception terminal, corresponding delay information at least based on the clock reference information and actual arrival time of the service to be transmitted, the method further includes: after receiving, by the reception terminal, a configuration parameter such as a delay information feedback period transmitted by the target terminal, and feeding back, by the reception terminal, the corresponding delay information determined to the target terminal based on the configuration parameter such as the delay information feedback period.

Optionally, the receiving, by the reception terminal, the service to be transmitted that is transmitted by the transmission terminal includes: under a condition that the transmission terminal is a first terminal, the reception terminal is a second terminal and the target terminal is the first terminal, receiving, by the reception terminal, configuration parameters such as the service to be transmitted and a corresponding delay information feedback period transmitted by the transmission terminal; and after the demodulating the service to be transmitted, obtaining, by the reception terminal, the clock reference information, and determining, by the reception terminal, corresponding delay information at least based on the clock reference information and actual arrival time of the service to be transmitted, the method further includes: feeding back, by the reception terminal, the corresponding delay information determined to the target terminal based on the configuration parameter such as the delay information feedback period.

Optionally, the feeding back, by the reception terminal, the corresponding delay information determined to the target terminal based on the configuration parameter such as the delay information feedback period includes: feeding back, by the reception terminal, the delay information to the target terminal directly on an uplink subframe adjacent to a subframe on which the service to be transmitted is received; or, feeding back, by the reception terminal, the delay information to the target terminal according to a period for receiving the service to be transmitted; or, feeding back, by the reception terminal, the delay information to the target terminal based on a preset time interval, where the delay information is an average of corresponding delay information within the time interval; or, under a condition determining that the delay information reaches a preset delay threshold corresponding to the service to be transmitted, feeding back, by the reception terminal, the delay information to the target terminal.

Optionally, after receiving, by the reception terminal, the configuration parameter such as a delay information feedback period transmitted by the target terminal, feeding back, by the reception terminal, the corresponding delay information determined to the target terminal based on the configuration parameter such as the delay information feedback period includes: feeding back the delay, by the reception terminal, information to the target terminal directly on an uplink subframe adjacent to a subframe on which the service to be transmitted is received; or, feeding back, by the reception terminal, the delay information to the target terminal according to a period for receiving the service to be transmitted; or, feeding back, by the reception terminal, the delay information to the target terminal based on a preset time interval, where the delay information is an average of corresponding delay information within the time interval; or, under a condition determining that the delay information reaches a preset delay threshold corresponding to the service to be transmitted, feeding back, by the reception terminal, the delay information to the target terminal.

Optionally, after receiving, by the reception terminal, the configuration parameter such as a delay information feedback period transmitted by the target terminal, and the feeding back, by the reception terminal, the corresponding delay information determined to the target terminal based on the configuration parameter such as the delay information feedback period includes: feeding back, by the reception terminal, the delay information to the target terminal directly on an uplink subframe adjacent to a subframe on which the service to be transmitted is received; or, feeding back, by the reception terminal, the delay information to the target terminal according to a period for receiving the service to be transmitted; or, feeding back, by the reception terminal, the delay information to the target terminal based on a preset time interval, where the delay information is an average of corresponding delay information within the time interval; or, under a condition determining that the delay information reaches a preset delay threshold corresponding to the service to be transmitted, feeding back, by the reception terminal, the delay information to the target terminal.

Optionally, the receiving, by the reception terminal, the service to be transmitted that is transmitted by the transmission terminal includes: under a condition that the transmission terminal is a terminal and the reception terminal is a base station, receiving, by the reception terminal, the service to be transmitted that is transmitted by the transmission terminal; and after the demodulating, by the reception terminal, the service to be transmitted, obtaining, by the reception terminal, the clock reference information, and determining corresponding delay information at least based on the clock reference information and actual arrival time of the service to be transmitted, the method further includes: performing, by the reception terminal, a corresponding operation based on the corresponding delay information determined.

In a fourth aspect, a method for measuring delay information is provided. The method includes: obtaining, by a transmission terminal, a service to be transmitted, where the service to be transmitted carries clock reference information corresponding to the service to be transmitted, and the clock reference information represents reference arrival time of the service to be transmitted to a reception terminal; and transmitting, by the transmission terminal, the service to be transmitted to the reception terminal, to cause the reception terminal to determine corresponding delay information at least based on the clock reference information and actual arrival time of the service to be transmitted.

In a fifth aspect, a computer device is provided. The computer device includes: a memory, configured to store an executable instruction; and a processor, configured to read and execute the executable instruction stored in the memory and execute the method for measuring and feeding back delay information in the first aspect.

In a sixth aspect, a network device is provided. The network device includes: a memory, configured to store an executable instruction; and a processor, configured to read and execute the executable instruction stored in the memory and execute the method for measuring and feeding back delay information in the second aspect.

In a seventh aspect, a computer device is provided. The computer device includes: a memory, configured to store an executable instruction; and a processor, configured to read and execute the executable instruction stored in the memory and execute the method for measuring delay information in the third aspect.

In an eighth aspect, a network device is provided. The network device includes: a memory, configured to store an executable instruction; and a processor, configured to read and execute the executable instruction stored in the memory and execute the method for measuring delay information in the fourth aspect.

In a ninth aspect, an apparatus for measuring and feeding back delay information is provided. The apparatus includes: a reception unit configured to receive, by a reception terminal, a physical layer signal or channel that is transmitted by a transmission terminal and carries clock reference information corresponding to a service to be transmitted, where the clock reference information represents reference arrival time of the service to be transmitted to the reception terminal; a determination unit, configured to demodulate the physical layer signal or channel, obtain the clock reference information, and determine corresponding delay information at least based on the clock reference information and actual arrival time of the physical layer signal or channel by the reception terminal; and a feedback unit configured to feed back the delay information to a target terminal by the reception terminal.

In a tenth aspect, an apparatus for measuring and feeding back delay information is provided. The apparatus includes: a configuration unit configured to configure, by a transmission terminal based on a service to be transmitted that is obtained, a physical layer signal or channel carrying clock reference information corresponding to the service to be transmitted, where the clock reference information represents reference arrival time of the service to be transmitted to a reception terminal; and a transmission unit configured to transmit the service to be transmitted and the physical layer signal or channel to the reception terminal by the transmission terminal, to cause the reception terminal to feed back the delay information to a target terminal, where the delay information is determined by the reception terminal at least based on the clock reference information and actual arrival time of the physical layer signal or channel.

In an eleventh aspect, an apparatus for measuring delay information is provided. The apparatus includes: a reception unit configured to receive, by a reception terminal, a service to be transmitted that is transmitted by a transmission terminal, where the service to be transmitted carries clock reference information corresponding to the service to be transmitted, and the clock reference information represents reference arrival time of the service to be transmitted to the reception terminal; and a determination unit configured to demodulate the service to be transmitted, obtain the clock reference information, and determine corresponding delay information at least based on the clock reference information and actual arrival time of the service to be transmitted by the reception terminal.

In a twelfth aspect, an apparatus for measuring delay information is provided. The apparatus includes: an obtaining unit configured to obtain a service to be transmitted by a transmission terminal, where the service to be transmitted carries clock reference information corresponding to the service to be transmitted, and the clock reference information represents reference arrival time of the service to be transmitted to a reception terminal; and a transmission unit configured to transmit the service to be transmitted to the reception terminal by the transmission terminal, to cause the reception terminal to determine corresponding delay information at least based on the clock reference information and actual arrival time of the service to be transmitted.

In a thirteenth aspect, a computer-readable storage medium is provided. When an instruction in the computer-readable storage medium is executed by a processor, the processor may execute the method according to any item in the first aspect above.

In a fourteenth aspect, a computer-readable storage medium is provided. When an instruction in the computer-readable storage medium is executed by a processor, the processor may execute the method according to any item in the second aspect above.

In a fifteenth aspect, a computer-readable storage medium is provided. When an instruction in the computer-readable storage medium is executed by a processor, the processor may execute the method according to any item in the third aspect above.

In a sixteenth aspect, a computer-readable storage medium is provided. When an instruction in the computer-readable storage medium is executed by a processor, the processor may execute the method according to any item in the fourth aspect above.

According to the embodiment of the present disclosure, the reception terminal receives the physical layer signal or channel that is transmitted by the transmission terminal and carries the clock reference information corresponding to the service to be transmitted, where the clock reference information represents the reference arrival time of the service to be transmitted to the reception terminal; and then, the reception terminal demodulates the physical layer signal or channel, obtains the clock reference information, and determines the corresponding delay information at least based on the clock reference information and the actual arrival time of the physical layer signal or channel, and then the reception terminal feeds back the delay information to the target terminal. In this way, a complete mechanism for measuring and feeding back delay information can be established, the reception terminal can determine the corresponding delay information in real time according to the physical layer signal and channel received, and then the target terminal can optimize queuing priority in a protocol stack or scheduling mechanism in real time based on the delay information fed back by the reception terminal, thereby solving the problems of scheduling congestion and a long terminal-to-terminal data transmission delay.

DETAILED DESCRIPTION

In order to solve problems, according to an embodiment of the present disclosure, a reception terminal receives a physical layer signal or channel that is transmitted by a transmission terminal and carries clock reference information corresponding to a service to be transmitted, where the clock reference information represents reference arrival time of the service to be transmitted to the reception terminal. Then, the physical layer signal or channel is demodulated, the clock reference information is obtained, corresponding delay information is determined at least based on the clock reference information and actual arrival time of the physical layer signal or channel, and then the reception terminal feeds back the delay information to a target terminal, thereby measuring and feeding back the delay information, to cause the target terminal to optimize a resource scheduling process based on the delay information accordingly.

Figures 1, 2:
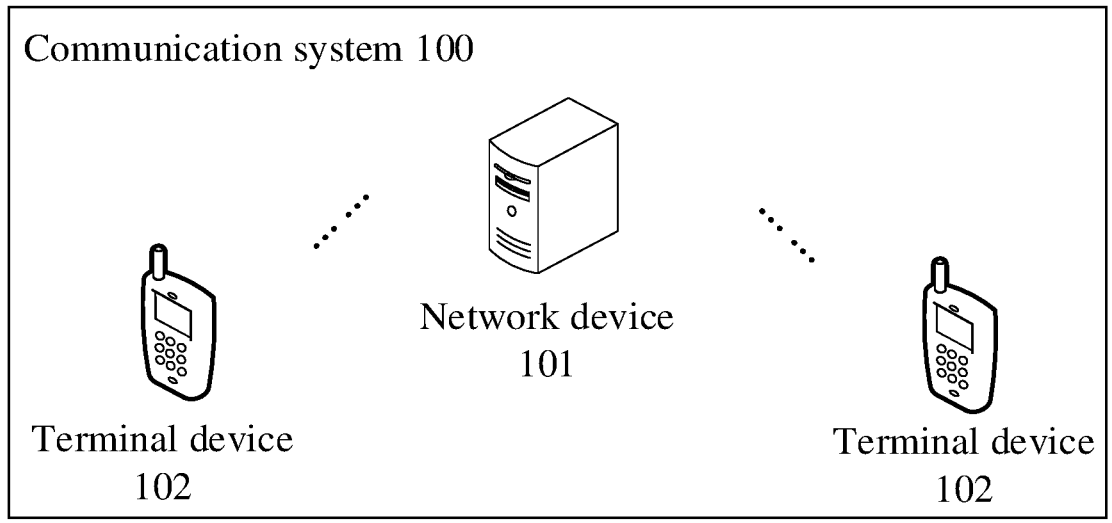
FIG. 1 is a schematic architectural diagram of a communication system in an embodiment of the present disclosure.
FIG. 2 is a schematic flowchart of measurement and feedback for delay information in an embodiment of the present disclosure.

For the convenience of understanding the embodiment of the present disclosure, at first, a communication system applied to the embodiment of the present disclosure will be described in detail by taking a communication system shown in FIG. 1 as an example. FIG. 1 shows a schematic diagram of a communication system applied to delay information measurement and feedback according to the embodiment of the present disclosure.

With reference to FIG. 1, the communication system 100 includes a network device 101 and several terminal devices 102. In the communication system 100, the network device

101 may communicate with one terminal device 102, and the network device 101 may also communicate with two terminal devices 102. Similarly, any terminal device 102 may communicate with another terminal device 102.

Optionally, the communication system may further include several terminal devices 102, and correspondingly, any terminal device 102 may communicate with several other terminal devices 102, which is not shown in FIG. 1 since FIG. 1 is a simplified schematic diagram merely for the convenience of understanding in the embodiment of the present disclosure.

A network architecture and a service scenario described in the embodiment of the present disclosure are for more clearly describing a technical solution of the embodiment of the present disclosure, and do not constitute limitation to the technical solution according to the embodiment of the present disclosure. It is conceivable to those skilled in the art that with evolution of the network architecture and emergence of a new service scenario, the technical solution according to the embodiment of the present disclosure is further applicable to similar technical problems.

Preferred implementation modes of the present disclosure will be further described below in detail in conjunction with accompanying drawings.

With reference to FIG. 2, in the embodiment of the present disclosure, a specific process of measuring and feeding back delay information through a physical layer signal or channel is as follows.

Step 200: a transmission terminal, based on a service to be transmitted that is obtained, configures a physical layer signal or channel carrying clock reference information corresponding to the service to be transmitted, where the clock reference information represents reference arrival time of the service to be transmitted to a reception terminal.

In the embodiment of the present disclosure, the transmission terminal of the service to be transmitted may be a base station or a terminal, and the transmission terminal configures a corresponding physical layer signal or physical layer channel based on the service to be transmitted that is obtained. The physical layer signal or physical layer channel carries the clock reference information corresponding to the service to be transmitted, and the physical layer signal or physical layer channel includes, but is not limited to, any one of three forms as follows: a preamble signal; a reference signal (RS); or other physical layer signals or physical layer channels.

In the embodiment of the present disclosure, the clock reference information corresponding to the service to be transmitted includes any one of expression forms as follows.

A. An interval determined based on absolute time and a first allowable value corresponding to the service to be transmitted.

During specific implementation, based on different service types, the clock reference information includes, but is not limited to, any one of expression forms as follows: a1. absolute time±first time jitter allowable value; or a2. absolute time±first delay allowable range.

B. An interval determined based on a subframe (with granularity lower than a preset threshold) sequence number and a second allowable value corresponding to the service to be transmitted.

During specific implementation, based on different service types, the clock reference information includes, but is not limited to, any one of expression forms as follows: b1. subframe (with granularity lower than a preset threshold) sequence number±second time jitter allowable value; or b2. subframe (with granularity lower than a preset threshold) sequence number±second delay allowable range.

C. an interval determined based on a third allowable value corresponding to the service to be transmitted and a delay budget, where under the condition that the clock reference information is expressed as the delay budget, the physical layer signal or channel further carries start transmission time of the physical layer signal or channel, and the delay information is determined by the reception terminal based on the clock reference information, the start transmission time of the physical layer signal or channel and the actual arrival time of the physical layer signal or channel.

During specific implementation, based on different service types, the clock reference information includes, but is not limited to, any one of expression forms as follows: c1. delay budget±third time jitter allowable value; or c2. delay budget±third delay allowable range.

Step 210: the transmission terminal transmits the service to be transmitted and the physical layer signal or channel to the reception terminal to cause the reception terminal to feed back delay information to a target terminal, where the delay information is determined by the reception terminal at least based on the clock reference information and actual arrival time of the physical layer signal or channel.

During specific implementation, the transmission terminal may transmit the service to be transmitted and the physical layer signal or channel to the reception terminal, to cause the reception terminal to determine corresponding delay information at least based on the clock reference information carried on the physical layer signal or channel and the actual arrival time of the physical layer signal or channel.

After the corresponding delay information is determined by the reception terminal, the reception terminal may send the delay information to the target terminal.

Optionally, after the target terminal receives the delay information fed back by the reception terminal, the target terminal may optimize queuing priority in a protocol stack or a scheduling mechanism based on the delay information, thereby relieving scheduling congestion and shortening terminal-to-terminal data transmission delay.

In an actual application scenario, the transmission terminal may be a base station or a terminal. Then, based on different types of the transmission terminals, corresponding application scenarios may include, but is not limited to, any one of four cases as follows.

Case 1. under the condition that the transmission terminal is a base station, the reception terminal is a terminal and the target terminal is the base station, the transmission terminal transmits configuration parameters such as the service to be transmitted, the physical layer signal or channel and a corresponding delay information feedback period to the reception terminal, to cause the reception terminal to feed back the delay information to the target terminal based on the configuration parameter such as the delay information feedback period.

In the embodiment of the present disclosure, since the service to be transmitted that needs to be transmitted to the terminal exits in the base station, a corresponding application scenario is as follows: the transmission terminal is a base station, the reception terminal is the terminal, and the target terminal is the base station.

Then, the transmission terminal transmits configuration parameters such as the service to be transmitted, the physical layer signal or channel and a corresponding delay information feedback period to the reception terminal, where the physical layer signal or channel carries clock reference information corresponding to the service to be transmitted, and the clock reference information represents reference arrival time of the service to be transmitted to the reception terminal. The reception terminal may feed back the delay information to the target terminal based on the configuration parameter such as the delay information feedback period.

Case 2. under the condition that the transmission terminal is a first terminal, the reception terminal is a second terminal and the target terminal is the first terminal, the transmission terminal transmits configuration parameters such as the service to be transmitted, the physical layer signal or channel and a corresponding delay information feedback period to the reception terminal, to cause the reception terminal to feed back the delay information to the target terminal based on the configuration parameter such as the delay information feedback period.

In the embodiment of the present disclosure, since the service to be transmitted that needs to be transmitted to the second terminal in a direct communication mode (not through a base station) exists in the first terminal, a corresponding application scenario is as follows: the transmission terminal is the first terminal, the reception terminal is the second terminal, and the target terminal is the first terminal. The application scenario includes, but is not limited to, either of two cases as follows.

1) Under the Condition that the First Terminal and the Second Terminal are in the Same Service Cell.

During specific implementation, the transmission terminal transmits configuration parameters such as the service to be transmitted, the physical layer signal or channel and a corresponding delay information feedback period to the reception terminal, and the reception terminal is caused to feed back the delay information to the target terminal based on the configuration parameter such as the delay information feedback period.

2) Under the Condition that the First Terminal and the Second Terminal are in Different Service Cells.

During specific implementation, in order to ensure that the first terminal and the second terminal have the same understanding for the subframe sequence number, it is necessary to perform synchronous clock operation in advance.

Then, the transmission terminal transmits configuration parameters such as the service to be transmitted, the physical layer signal or channel and a corresponding delay information feedback period to the reception terminal, and the reception terminal is caused to feed back the delay information to the target terminal based on the configuration parameter such as the delay information feedback period.

Case 3. under the condition that the transmission terminal is a base station, the reception terminal is a second terminal, the target terminal is the base station, the service to be transmitted is transmitted to the base station by the first terminal, and the clock reference information is obtained by demodulating through the base station the physical layer signal or channel transmitted by the first terminal, the transmission terminal transmits configuration parameters such as the service to be transmitted, the physical layer signal or channel and a corresponding delay information feedback period to the reception terminal, and the reception terminal is caused to feed back the delay information to the target terminal based on the configuration parameter such as the delay information feedback period.

In the embodiment of the present disclosure, since the service to be transmitted that needs to be transmitted to the second terminal through the base station exists in the first terminal, a corresponding application scenario is as follows: the transmission terminal is the base station, the reception terminal is the terminal, and the target terminal is the base station.

Then, the transmission terminal transmits configuration parameters such as the service to be transmitted, the physical layer signal or channel and a corresponding delay information feedback period to the reception terminal, and the reception terminal is caused to feed back the delay information to the target terminal based on the configuration parameter such as the delay information feedback period. The service to be transmitted is transmitted to the base station by the first terminal, and the clock reference information is obtained by demodulating through the base station the physical layer signal or channel transmitted by the first terminal.

Case 4. under the condition that the transmission terminal is a first terminal, the reception terminal is a second terminal and the target terminal is a base station, the transmission terminal transmits the service to be transmitted and the physical layer signal or channel to the reception terminal, so that the reception terminal receives a configuration parameter such as a delay information feedback period transmitted by the target terminal and feeds back the delay information to the target terminal based on the configuration parameter such as the delay information feedback period.

In the embodiment of the present disclosure, since the service to be transmitted that needs to be transmitted to the second terminal exists in the first terminal, a corresponding application scenario is as follows: the transmission terminal is the first terminal, the reception terminal is the second terminal, and the target terminal is the base station.

Then, the transmission terminal transmits the service to be transmitted and the physical layer signal or channel to the reception terminal, where the physical layer signal or channel carries the clock reference information corresponding to the service to be transmitted, and the reception terminal is caused to receive a configuration parameter such as a delay information feedback period transmitted by the target terminal and feed back the delay information to the target terminal based on the configuration parameter such as the delay information feedback period.

Optionally, in order to make the target terminal obtain the delay information fed back by the reception terminal in time, the target terminal may transmit the configuration parameter such as the corresponding delay information feedback period to the reception terminal when the transmission terminal transmits the physical layer signal or channel to the reception terminal. The target terminal may further inform the reception terminal of the configuration parameter such as the corresponding delay information feedback period at any time in a broadcast or other forms.

Figure 3:
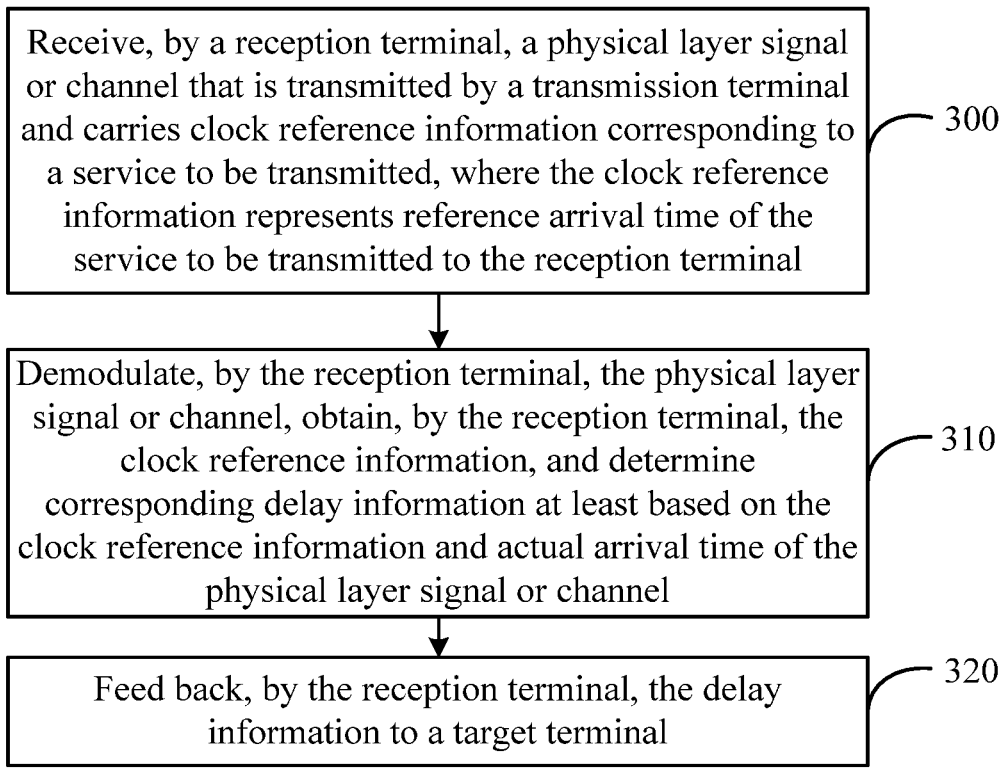
FIG. 3 is a schematic flowchart of measurement and feedback for delay information in an embodiment of the present disclosure.

With reference to FIG. 3, in the embodiment of the present disclosure, a specific process of measuring and feeding back delay information through the physical layer signal or channel is as follows.

Step 300: a reception terminal receives a physical layer signal or channel that is transmitted by a transmission terminal and carries clock reference information corresponding to a service to be transmitted, where the clock reference information represents reference arrival time of the service to be transmitted to the reception terminal.

In the embodiment of the present disclosure, the clock reference information corresponding to the service to be transmitted includes any one of expression forms as follows.

A. an interval determined based on absolute time and a first allowable value corresponding to the service to be transmitted.

During specific implementation, based on different service types, the clock reference information includes, but is not limited to, any one of expression forms as follows: a1. absolute time±first time jitter allowable value; or a2. absolute time±first delay allowable range.

B. an interval determined based on a subframe (with granularity lower than a preset threshold) sequence number and a second allowable value corresponding to the service to be transmitted.

During specific implementation, based on different service types, the clock reference information includes, but is not limited to, any one of expression forms as follows: b1. subframe (with granularity lower than a preset threshold) sequence number±second time jitter allowable value; or b2. subframe (with granularity lower than a preset threshold) sequence number±second delay allowable range.

C. an interval determined based on a third allowable value corresponding to the service to be transmitted and a delay budget, where under the condition that the clock reference information is expressed as the delay budget, the physical layer signal or channel further carries start transmission time of the physical layer signal or channel, and the delay information is determined based on the clock reference information, the start transmission time of the physical layer signal or channel and the actual arrival time of the physical layer signal or channel.

During specific implementation, based on different service types, the clock reference information includes, but is not limited to, any one of expression forms as follows: c1. delay budget±third time jitter allowable value; or c2. delay budget±third delay allowable range.

In an actual application scenario, the transmission terminal may be a base station or a terminal. Then, based on different types of the transmission terminals, information that is transmitted by the transmission terminal and received by the reception terminal may include, but is not limited to, any one of four cases as follows.

Case 1. under the condition that the transmission terminal is a base station, the reception terminal is a terminal and the target terminal is the base station, the reception terminal receives configuration parameters, such as the physical layer signal or channel carrying the clock reference information corresponding to the service to be transmitted and a corresponding delay information feedback period, transmitted by the transmission terminal.

Case 2. under the condition that the transmission terminal is a first terminal, the reception terminal is a second terminal and the target terminal is the first terminal, the reception terminal receives configuration parameters, such as the physical layer signal or channel carrying the clock reference information corresponding to the service to be transmitted and a corresponding delay information feedback period, transmitted by the transmission terminal.

Case 3. under the condition that the transmission terminal is a base station, the reception terminal is a second terminal, the target terminal is the base station, the service to be transmitted is transmitted to the base station by the first terminal, and the clock reference information is obtained by demodulating through the base station the physical layer signal or channel transmitted by the first terminal, the reception terminal receives configuration parameters, such as the physical layer signal or channel carrying the clock reference information corresponding to the service to be transmitted and a corresponding delay information feedback period, transmitted by the transmission terminal.

Case 4. under the condition that the transmission terminal is a first terminal, the reception terminal is a second terminal and the target terminal is a base station, the reception terminal receives the physical layer signal or channel carrying the clock reference information corresponding to the service to be transmitted from the transmission terminal, and receives a configuration parameter such as a corresponding delay information feedback period transmitted by the target terminal.

Step 310: the reception terminal demodulates the physical layer signal or channel, obtains the clock reference information, and determines corresponding delay information at least based on the clock reference information and actual arrival time of the physical layer signal or channel.

In the embodiment of the present disclosure, the reception terminal demodulates the physical layer signal or channel, obtains the clock reference information corresponding to the service to be transmitted, and determines the delay information corresponding to the service to be transmitted at least based on the clock reference information and actual arrival time of the physical layer signal or channel.

Optionally, according to different actual application scenarios, the reception terminal determines the corresponding delay information in a mode including but not limited to any of cases as follows.

Case 1. under the condition that the transmission terminal is a base station, the reception terminal is a terminal and the target terminal is the base station, the reception terminal subtracts the clock reference information from the actual arrival time of the physical layer signal or channel to obtain a corresponding delay measurement value, and then the reception terminal determines the delay information corresponding to the service to be transmitted.

Case 2. under the condition that the transmission terminal is a first terminal, the reception terminal is a second terminal and the target terminal is the first terminal, the reception terminal subtracts the clock reference information from the actual arrival time of the physical layer signal or channel to obtain a corresponding delay measurement value, and the reception terminal determines the delay information corresponding to the service to be transmitted.

Case 3. under the condition that the transmission terminal is a base station, the reception terminal is a second terminal, the target terminal is the base station, the service to be transmitted is transmitted to the base station by the first terminal, and the clock reference information is obtained by demodulating through the base station the physical layer signal or channel transmitted by the first terminal, the reception terminal subtracts the clock reference information from the actual arrival time of the physical layer signal or channel to obtain a corresponding delay measurement value, and the reception terminal determines the delay information corresponding to the service to be transmitted.

Case 4. under the condition that the transmission terminal is a first terminal, the reception terminal is a second terminal and the target terminal is a base station, the reception terminal subtracts the clock reference information from the actual arrival time of the physical layer signal or channel to obtain a corresponding delay measurement value, and the reception terminal determines the delay information corresponding to the service to be transmitted.

Optionally, the delay measurement value may be positive, zero or negative.

Optionally, under the condition that the clock reference information is expressed as the delay budget, the reception terminal determines the corresponding delay information based on the clock reference information, the start transmission time of the physical layer signal or channel and the actual arrival time of the physical layer signal or channel in the operation mode above.

Step 320: the reception terminal feeds back the delay information to a target terminal.

In the embodiment of the present disclosure, the reception terminal determines the corresponding delay information, and feeds back the delay information to the target terminal based on the configuration parameter such as the delay information feedback period.

Optionally, a feedback mode of feedback delay information includes, but is not limited to, any one of four forms as follows.

A. The reception terminal receives the clock reference information and then feeds back the delay information to the target terminal directly on an uplink subframe adjacent to a subframe of the service to be transmitted.

B. The reception terminal receives the clock reference information and then feeds back the delay information to the target terminal according to a period of transmitting service data of the service to be transmitted by the transmission terminal.

C. The reception terminal receives the clock reference information and then feeds back the delay information to the target terminal based on a time interval that is preset, where the delay information is an average of corresponding delay information within the time interval.

D. The reception terminal determines that the delay information reaches a preset delay threshold corresponding to the service to be transmitted after the reception terminal receives the clock reference information, and then feeds back the delay information to the target terminal.

Figure 4:
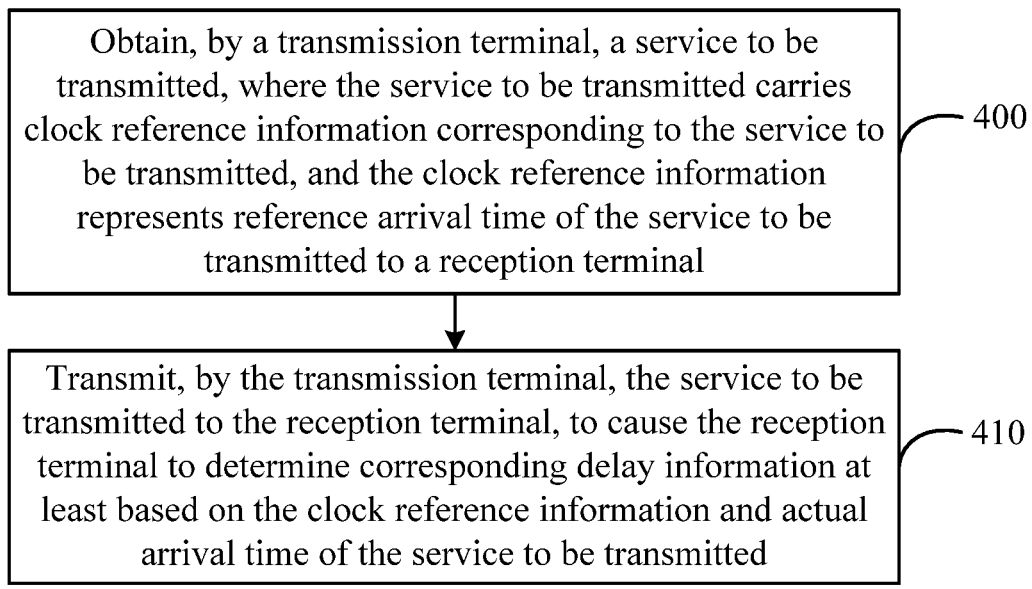
FIG. 4 is a schematic flowchart of measurement for delay information in an embodiment of the present disclosure.

With reference to FIG. 4, in the embodiment of the present disclosure, a specific process of measuring delay information through a user plane is as follows.

Step 400: a transmission terminal receives a service to be transmitted, where the service to be transmitted carries clock reference information corresponding to the service to be transmitted, and the clock reference information represents reference arrival time of the service to be transmitted to a reception terminal.

In the embodiment of the present disclosure, the transmission terminal obtains the service to be transmitted carrying the clock reference information corresponding to the service to be transmitted, where the clock reference information represents the reference arrival time of the service to be transmitted to the reception terminal.

Optionally, under the condition that the service to be transmitted is transmitted by the transmission terminal according to a preset period, the clock reference information represents reference arrival time of a first service data packet of the service to be transmitted to the reception terminal and time interval information corresponding to periodic transmission of the service to be transmitted by the transmission terminal.

In the embodiment of the present disclosure, the clock reference information corresponding to the service to be transmitted includes any one of expression forms as follows.

A. An interval determined based on absolute time and a first allowable value corresponding to the service to be transmitted.

During specific implementation, based on different service types, the clock reference information includes, but is not limited to, any one of expression forms as follows: a1. absolute time±first time jitter allowable value; or a2. absolute time±first delay allowable range.

B. An interval determined based on a subframe (with granularity lower than a preset threshold) sequence number and a second allowable value corresponding to the service to be transmitted.

During specific implementation, based on different service types, the clock reference information includes, but is not limited to, any one of expression forms as follows: b1. subframe (with granularity lower than a preset threshold) sequence number±second time jitter allowable value; or b2. subframe (with granularity lower than a preset threshold) sequence number±second delay allowable range.

C. An interval determined based on a third allowable value corresponding to the service to be transmitted and a delay budget, where under the condition that the clock reference information is expressed as the delay budget, the service to be transmitted further carries start transmission time of the service to be transmitted, and the delay information is determined by the reception terminal based on the clock reference information, the start transmission time of the service to be transmitted and actual arrival time of the service to be transmitted.

During specific implementation, based on different service types, the clock reference information includes, but is not limited to, any one of expression forms as follows: c1. delay budget±third time jitter allowable value; or c2. delay budget±third delay allowable range.

Step 410: the transmission terminal transmits the service to be transmitted to the reception terminal, and the reception terminal is caused to determine corresponding delay information at least based on the clock reference information and actual arrival time of the service to be transmitted.

During specific implementation, the transmission terminal may transmit the service to be transmitted carrying the clock reference information corresponding to the service to be transmitted to the reception terminal, so that the reception terminal determines the corresponding delay information at least based on the clock reference information and the actual arrival time of the service to be transmitted.

In an actual application scenario, the transmission terminal may be a base station or a terminal. Then, based on different types of the transmission terminals, corresponding application scenarios may include, but is not limited to, any one of four cases as follows.

Case 1. under the condition that the transmission terminal is a base station, the reception terminal is a terminal and the target terminal is the base station, the transmission terminal transmits configuration parameters such as the service to be transmitted and a corresponding delay information feedback period to the reception terminal, so that the reception terminal receives the service to be transmitted, then determines the corresponding delay information at least based on the clock reference information of the service to be transmitted and the actual arrival time of the service to be transmitted, and feeds back the delay information to the target terminal based on the configuration parameter obtained such as the delay information feedback period.

In the embodiment of the present disclosure, since the service to be transmitted that needs to be transmitted to the terminal exits in the base station, a corresponding application scenario is as follows: the transmission terminal is the base station, the reception terminal is the terminal, and the target terminal is the base station.

Then, the transmission terminal transmits configuration parameters such as the service to be transmitted and a corresponding delay information feedback period to the reception terminal, where the service to be transmitted carries clock reference information corresponding to the service to be transmitted. The reception terminal is caused to determine the corresponding delay information at least based on the clock reference information and the actual arrival time of the service to be transmitted, and feed back the delay information to the target terminal based on the configuration parameter obtained such as the delay information feedback period.

Case 2. under the condition that the transmission terminal is a first terminal, the reception terminal is a second terminal and the target terminal is a base station, the transmission terminal transmits the service to be transmitted to the reception terminal, and the reception terminal is caused to receive the service to be transmitted, then determine the corresponding delay information at least based on the clock reference information of the service to be transmitted and the actual arrival time of the service to be transmitted, receive a configuration parameter such as a delay information feedback period transmitted by the target terminal, and feed back the delay information to the target terminal based on the configuration parameter obtained such as the delay information feedback period.

In the embodiment of the present disclosure, since the service to be transmitted that needs to be transmitted to the second terminal exists in the first terminal, a corresponding application scenario is as follows: the transmission terminal is the first terminal, the reception terminal is the second terminal, and the target terminal is the base station.

Then, the transmission terminal transmits the service to be transmitted to the reception terminal, where the service to be transmitted includes the clock reference information corresponding to the service to be transmitted, and the reception terminal is caused to determine the corresponding delay information at least based on the clock reference information and the actual arrival time of the service to be transmitted, receive a configuration parameter such as a delay information feedback period transmitted by the target terminal, and then feed back the delay information to the target terminal based on the configuration parameter such as the delay information feedback period.

Optionally, the base station may further inform the terminal of the configuration parameter such as the corresponding delay information feedback period through broadcasting, etc.

Case 3. under the condition that the transmission terminal is a first terminal, the reception terminal is a second terminal and the target terminal is the first terminal, the transmission terminal transmits configuration parameters such as the service to be transmitted and a corresponding delay information feedback period to the reception terminal, and the reception terminal is caused to receive the service to be transmitted, then determine the corresponding delay information at least based on the clock reference information of the service to be transmitted and the actual arrival time of the service to be transmitted, and feed back the delay information to the target terminal based on the configuration parameter obtained such as the delay information feedback period.

In the embodiment of the present disclosure, since the service to be transmitted that needs to be transmitted to the second terminal exists in the first terminal, a corresponding application scenario is as follows: the transmission terminal is the first terminal, the reception terminal is the second terminal, and the target terminal is the first terminal.

Then, the transmission terminal transmits configuration parameters such as the service to be transmitted and a corresponding delay information feedback period to the reception terminal, where the service to be transmitted carries clock reference information corresponding to the service to be transmitted. The reception terminal is caused to determine the corresponding delay information at least based on the clock reference information and the actual arrival time of the service to be transmitted, and feed back the delay information to the target terminal based on the configuration parameter obtained such as the delay information feedback period.

Case 4. under the condition that the transmission terminal is a terminal and the reception terminal is a base station, the transmission terminal transmits the service to be transmitted to the reception terminal, and the reception terminal is caused to determine corresponding delay information at least based on the clock reference information of the service to be transmitted and actual arrival time of the service to be transmitted.

In the embodiment of the present disclosure, the delay information includes any type of information as follows: 1) the delay information corresponding to the first service data packet in the service to be transmitted; 2) the delay information represents delay information corresponding to several preset first service data packets in the service to be transmitted; or 3) the delay information represents delay information corresponding to each service data packet in the service to be transmitted.

Figure 5:
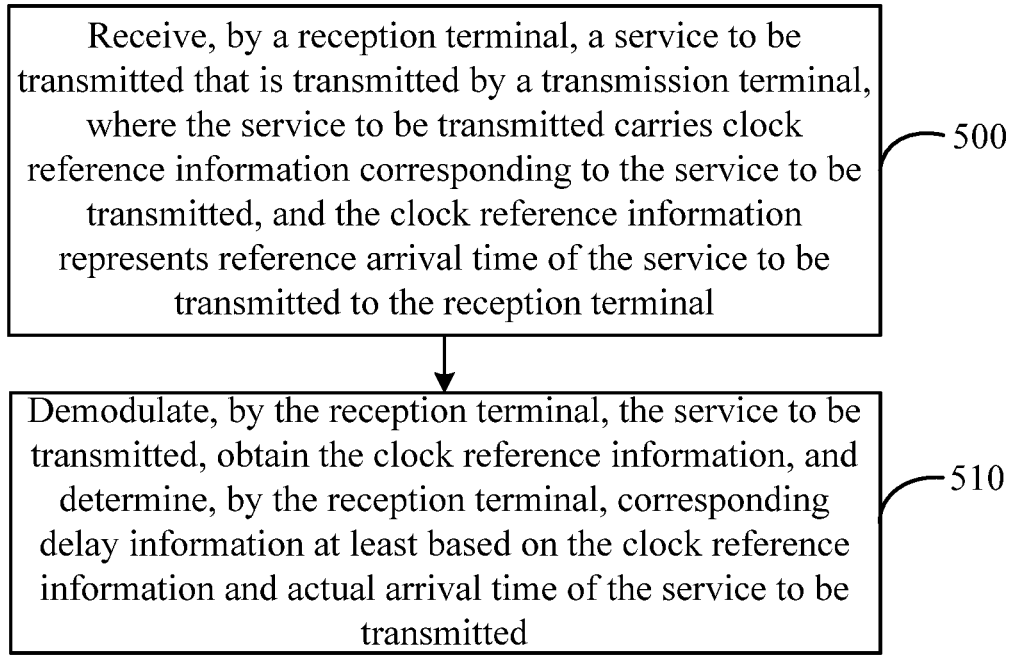
FIG. 5 is a schematic flowchart of measurement for delay information in an embodiment of the present disclosure.

With reference to FIG. 5, in the embodiment of the present disclosure, a specific process of measuring delay information through a user plane is as follows.

Step 500: a reception terminal receives a service to be transmitted that is transmitted by a transmission terminal, where the service to be transmitted carries clock reference information corresponding to the service to be transmitted, and the clock reference information represents reference arrival time of the service to be transmitted to the reception terminal.

In the embodiment of the present disclosure, the clock reference information corresponding to the service to be transmitted includes any one of expression forms as follows.

A. An interval determined based on absolute time and a first allowable value corresponding to the service to be transmitted.

During specific implementation, based on different service types, the clock reference information includes, but is not limited to, any one of expression forms as follows: a1. absolute time±first time jitter allowable value; or a2. absolute time±first delay allowable range.

B. An interval determined based on a subframe (with granularity lower than a preset threshold) sequence number and a second allowable value corresponding to the service to be transmitted.

During specific implementation, based on different service types, the clock reference information includes, but is not limited to, any one of expression forms as follows: b1. subframe (with granularity lower than a preset threshold) sequence number±second time jitter allowable value; or b2. subframe (with granularity lower than a preset threshold) sequence number±second delay allowable range.

C. An interval determined based on a third allowable value corresponding to the service to be transmitted and a delay budget, where under the condition that the clock reference information is expressed as the delay budget, the service to be transmitted further carries start transmission time of the service to be transmitted, and the delay information is determined based on the clock reference information, the start transmission time of the service to be transmitted and actual arrival time of the service to be transmitted.

Optionally, under the condition that the service to be transmitted is transmitted by the transmission terminal according to a preset period, the clock reference information represents reference arrival time of a first service data packet of the service to be transmitted to the reception terminal and time interval information corresponding to periodic transmission of the service to be transmitted by the transmission terminal.

In an actual application scenario, the transmission terminal may be a base station or a terminal. Then, based on different types of the transmission terminals, information that is transmitted by the transmission terminal and received by the reception terminal may include, but is not limited to, any of three cases as follows.

Case 1. under the condition that the transmission terminal is a base station, the reception terminal is a terminal and the target terminal is the base station, the reception terminal receives configuration parameters such as the service to be transmitted and a corresponding delay information feedback period transmitted by the transmission terminal.

Case 2. under the condition that the transmission terminal is a first terminal, the reception terminal is a second terminal and the target terminal is a base station, the reception terminal receives the service to be transmitted that is transmitted by the transmission terminal.

Case 3. under the condition that the transmission terminal is a first terminal, the reception terminal is a second terminal and the target terminal is the first terminal, the reception terminal receives configuration parameters such as the service to be transmitted and a corresponding delay information feedback period transmitted by the transmission terminal.

Case 4. under the condition that the transmission terminal is a terminal and the reception terminal is a base station, the reception terminal receives the service to be transmitted that is transmitted by the transmission terminal.

Step 510: the reception terminal demodulates the service to be transmitted, obtains the clock reference information, and determines corresponding delay information at least based on the clock reference information and actual arrival time of the service to be transmitted.

In the embodiment of the present disclosure, the reception terminal demodulates the service to be transmitted based on the service to be transmitted that is obtained, obtains the clock reference information corresponding to the service to be transmitted, and then subtracts the clock reference information from the actual arrival time of the service to be transmitted to obtain a corresponding delay measurement value, so that the reception terminal determines the delay information corresponding to the service to be transmitted.

Optionally, under the condition that the service to be transmitted is transmitted by the transmission terminal according to a preset period, the reception terminal demodulates the service to be transmitted based on the service to be transmitted that is obtained, obtains the clock reference information, and then performs an operation as follows.

Firstly, the reference arrival time to the reception terminal of the first service data packet in the clock reference information is added to the time interval information corresponding to the periodic transmission of the service to be transmitted by the transmission terminal, to obtain corresponding time information 1.

Then, the time information 1 is subtracted from the actual arrival time of the service to be transmitted, to obtain a corresponding delay measurement value, so that the reception terminal determines the delay information corresponding to the service to be transmitted.

Optionally, the delay measurement value may be positive, zero or negative.

Optionally, under the condition that the clock reference information is expressed as the delay budget, the reception terminal determines the corresponding delay information based on the clock reference information, the start transmission time of the service to be transmitted and the actual arrival time of the service to be transmitted in the operation mode above.

In the embodiment of the present disclosure, the delay information includes any type of information as follows: 1) the delay information corresponding to the first service data packet in the service to be transmitted; 2) the delay information represents delay information corresponding to several preset first service data packets in the service to be transmitted; or 3) the delay information represents delay information corresponding to each service data packet in the service to be transmitted.

Optionally, since the reception terminal may be a base station or a terminal, after the reception terminal determines the corresponding delay information, operations that the reception terminal may perform include, but are not limited to, four cases as follows.

Case 1. under the condition that the transmission terminal is a base station, the reception terminal is a terminal and the target terminal is the base station, the reception terminal feeds back the corresponding delay information determined to the target terminal based on a configuration parameter such as a delay information feedback period transmitted by the transmission terminal, and the target terminal is caused to optimize a resource scheduling process based on the delay information.

Case 2. under the condition that the transmission terminal is a first terminal, the reception terminal is a second terminal and the target terminal is a base station, the reception terminal may receive a configuration parameter such as a delay information feedback period transmitted by the target terminal, then feed back the delay information to the target terminal based on the configuration parameter such as the delay information feedback period, and the target terminal is caused to optimize a resource scheduling process based on the delay information.

Case 3. under the condition that the transmission terminal is a first terminal, the reception terminal is a second terminal and the target terminal is the first terminal, the reception terminal feeds back the corresponding delay information determined to the target terminal based on a configuration parameter such as a delay information feedback period transmitted by the transmission terminal, and the target terminal is caused to optimize a resource scheduling process based on the delay information.

Optionally, a feedback mode of feedback delay information includes, but is not limited to, any one of four forms as follows.

A. The reception terminal receives the clock reference information and then feeds back the delay information to the target terminal directly on an uplink subframe adjacent to a subframe of the service to be transmitted.

B. The reception terminal receives the clock reference information and then feeds back the delay information to the target terminal according to a period of transmitting service data of the service to be transmitted by the transmission terminal.

C. The reception terminal receives the clock reference information and then feeds back the delay information to the target terminal based on a time interval that is preset, where the delay information is an average of corresponding delay information within the time interval.

D. The reception terminal determines that the delay information reaches a preset delay threshold corresponding to the service to be transmitted after the reception terminal receives the clock reference information, and then feeds back the delay information to the target terminal.

Optionally, after the target terminal receives the delay information fed back by the reception terminal, the target terminal may optimize queuing priority in a protocol stack or a scheduling mechanism based on the delay information, thereby relieving scheduling congestion and shortening terminal-to-terminal data transmission delay.

Case 4. under the condition that the transmission terminal is a terminal and the reception terminal is a base station, the reception terminal determines the corresponding delay information, and then performs a corresponding operations based on the delay information, and the corresponding operation includes, but is not limited to, an operation as follows: scheduling congestion is optimized; or, queuing priority of service data is optimized; or, others.

The above embodiments will be further described in detail below through specific application scenarios.

Application Scenario 1

Figure 6:
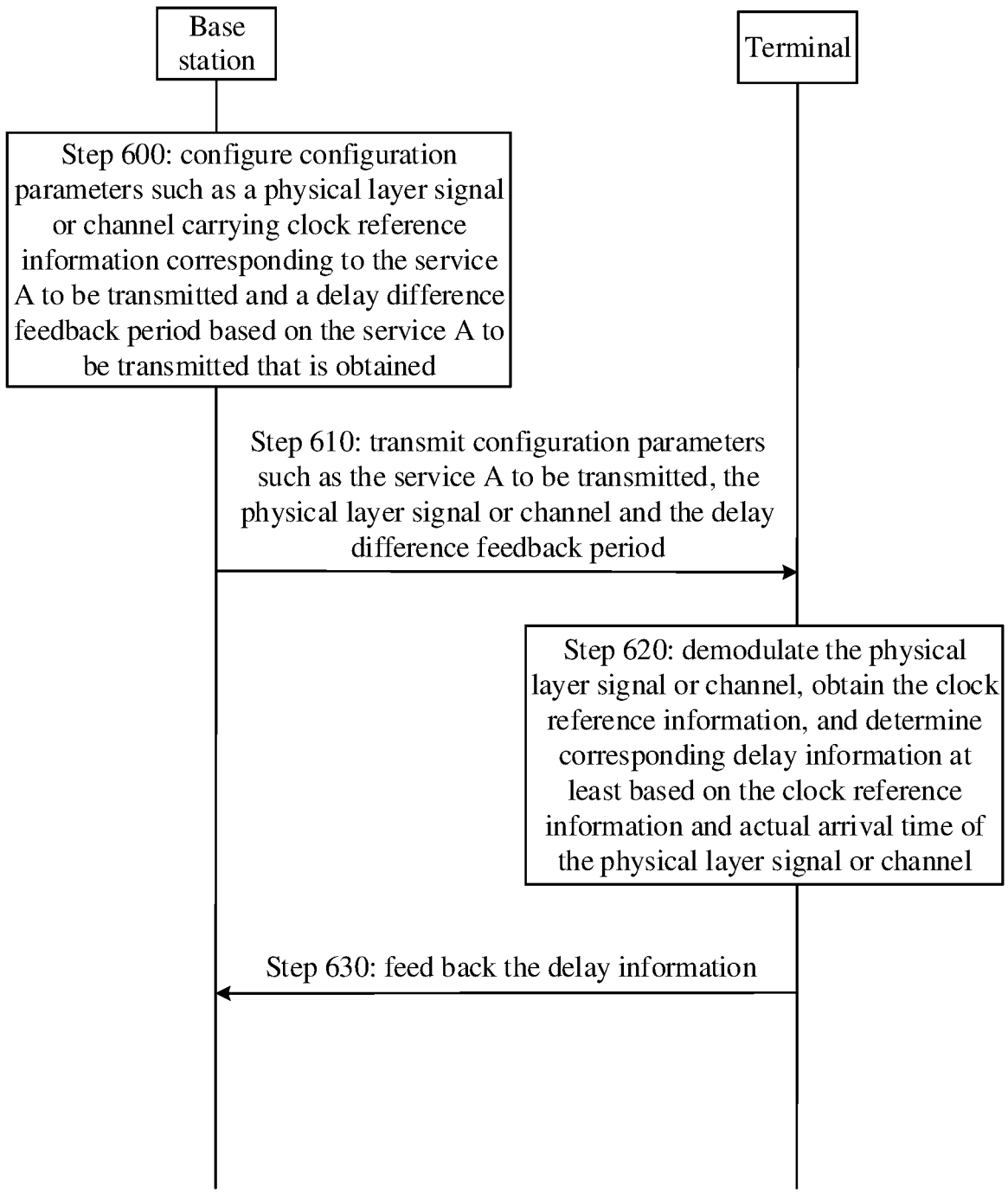
FIG. 6 is a schematic diagram of application scenario 1 in an embodiment of the present disclosure.

With reference to FIG. 6, it is assumed that a service A to be transmitted that needs to be transmitted to the terminal exists in the base station, and the base station transmits the corresponding clock reference information through the preamble, the RS or other physical layer signals or channels, the transmission terminal is a base station, the reception terminal is a terminal, and the target terminal is the base station, and the base station has known the clock reference information of the service A to be transmitted, where the clock reference information represents reference arrival time of the service A to be transmitted to the terminal.

Then, through interaction between the base station and the terminal, the base station may obtain the corresponding delay information. Specifically, an interaction process between the base station and the terminal is as follows.

Step 600: the base station configures configuration parameters such as a physical layer signal or channel carrying clock reference information corresponding to the service A to be transmitted and a delay information feedback period based on the service A to be transmitted that is obtained.

In the embodiment of the present disclosure, the base station configures corresponding configuration parameters such as the physical layer signal or channel and the delay information feedback period based on the clock reference information of the service A to be transmitted, where the physical layer signal or channel carries the clock reference information of the service A to be transmitted.

Step 610: the base station transmits configuration parameters such as the service A to be transmitted, the physical layer signal or channel and the delay information feedback period to the terminal.

In the embodiment of the present disclosure, the base station transmits the configuration parameters such as the service A to be transmitted, the physical layer signal or channel carrying the clock reference information of the service A to be transmitted and the delay information feedback period to the terminal, where the terminal feeds back the corresponding delay information to the base station based on the configuration parameter such as the delay information feedback period.

Optionally, the base station may further inform the terminal of the configuration parameter such as the corresponding delay information feedback period through broadcasting, etc.

Step 620: the terminal demodulates the physical layer signal or channel, obtains the clock reference information, and determines corresponding delay information at least based on the clock reference information and actual arrival time of the physical layer signal or channel.

In the embodiment of the present disclosure, the terminal receives the physical layer signal or channel transmitted by the base station, then demodulates the physical layer signal or channel, obtains the clock reference information of the service A to be transmitted, and subtracts the clock reference information from the actual arrival time of the physical layer signal or channel to obtain the corresponding delay measurement value, and then the terminal determines the corresponding delay information.

Optionally, the delay measurement value may be positive, zero or negative.

Optionally, under the condition that the clock reference information is expressed as the delay budget, the reception terminal determines the corresponding delay information based on the clock reference information, the start transmission time of the physical layer signal or channel and the actual arrival time of the physical layer signal or channel in the operation mode above.

Optionally, the terminal may further receive the service A to be transmitted, and in the case of timeout or channel condition, the terminal may not receive the service A to be transmitted that is transmitted by the base station.

Step 630: the terminal feeds back the delay information to the base station.

In the embodiment of the present disclosure, the terminal feeds back the delay information to the base station based on the configuration parameter obtained such as the delay information feedback period.

Application Scenario 2

Figure 7:
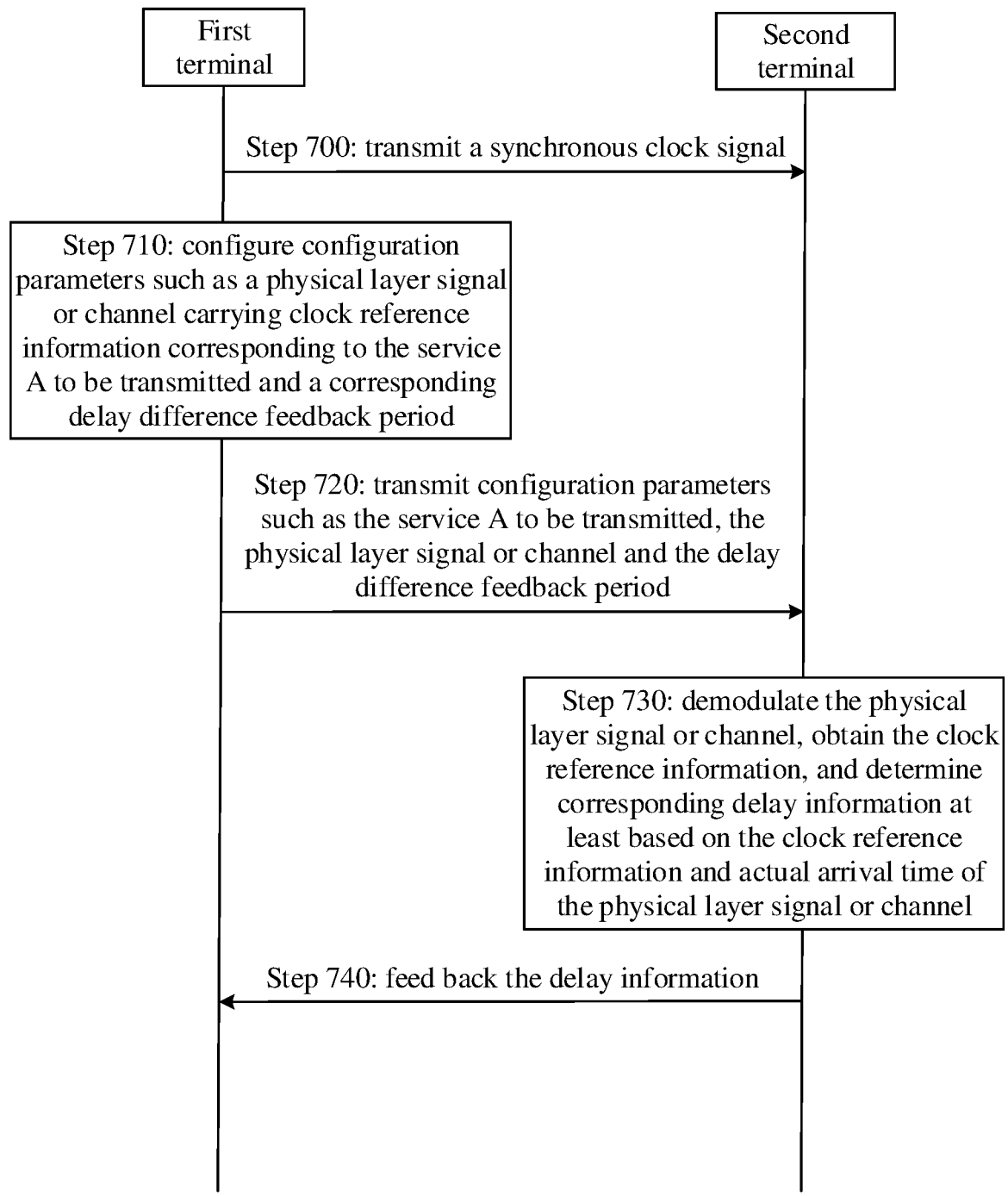
FIG. 7 is a schematic diagram of application scenario 2 in an embodiment of the present disclosure.

With reference to FIG. 7, it is assumed that a service A to be transmitted that needs to be transmitted to a second terminal in a direct communication mode (not through a base station) exists in a first terminal, and a base station transmits the corresponding clock reference information through the preamble, the RS or other physical layer signals or channels, the transmission terminal is the first terminal, the reception terminal is the second terminal, and the target terminal is the first terminal.

Then, the first terminal interacts with the second terminal, such that the first terminal may obtain the corresponding delay information. Specifically, an interaction process between the first terminal and the second terminal is as follows.

Step 700: the first terminal transmits a synchronous clock signal (a synchronous source) to the second terminal.

Step 710: based on a service to be transmitted that is obtained, the first terminal configures configuration parameters such as a physical layer signal or channel carrying clock reference information corresponding to the service A to be transmitted and a corresponding delay information feedback period, where the clock reference information represents reference arrival time of the service A to be transmitted to the second terminal.

In the embodiment of the present disclosure, the first terminal configures the physical layer signal or channel carrying the clock reference information corresponding to the service A to be transmitted based on the service A to be transmitted that is obtained, and configures the configuration parameter such as the corresponding delay information feedback period based on the service A to be transmitted, where the clock reference information represents reference arrival time of the service to be transmitted to the second terminal.

Step 720: the first terminal transmits configuration parameters such as the service A to be transmitted, the physical layer signal or channel and the delay information feedback period to the second terminal.

In the embodiment of the present disclosure, the first terminal transmits the configuration parameters such as the service A to be transmitted, the physical layer signal or channel carrying the clock reference information corresponding to the service A to be transmitted and the corresponding delay information feedback period to the second terminal.

Step 730: the second terminal demodulates the physical layer signal or channel, obtains the clock reference information, and determines corresponding delay information at least based on the clock reference information and actual arrival time of the physical layer signal or channel.

In the embodiment of the present disclosure, the second terminal receives the physical layer signal or channel transmitted by the first terminal, then demodulates the physical layer signal or channel, obtains the clock reference information of the service A to be transmitted, and subtracts the clock reference information from the actual arrival time of the physical layer signal or channel to obtain a corresponding delay measurement value, so that the second terminal determines the corresponding delay information.

Optionally, the delay measurement value may be positive, zero or negative.

Optionally, under the condition that the clock reference information is expressed as the delay budget, the reception terminal determines the corresponding delay information based on the clock reference information, the start transmission time of the physical layer signal or channel and the actual arrival time of the physical layer signal or channel in the operation mode above.

Optionally, the second terminal may further receive the service A to be transmitted, and in the case of timeout or channel condition, the second terminal may not receive the service A to be transmitted that is transmitted by the first terminal.

Step 740: the second terminal feeds back the delay information to the base station.

In the embodiment of the present disclosure, the second terminal feeds back the delay information to the base station based on the configuration parameter received such as the delay information feedback period.

Application Scenario 3

Figure 8:
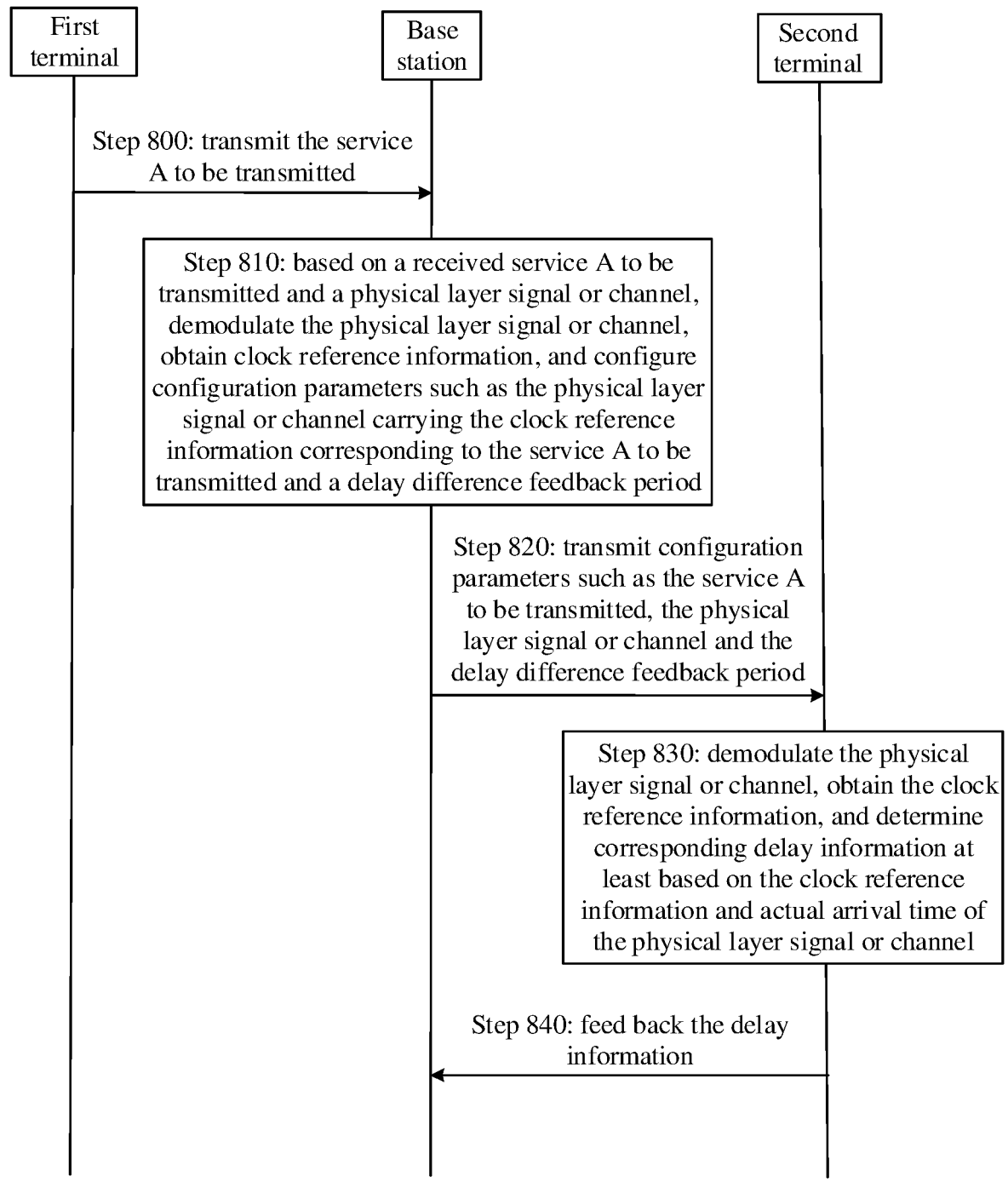
FIG. 8 is a schematic diagram of application scenario 3 in an embodiment of the present disclosure.

With reference to FIG. 8, it is assumed that a service A to be transmitted that needs to be transmitted to the second terminal exists in the first terminal through a base station, and the first terminal transmits the corresponding clock reference information through the preamble, the RS or other physical layer signals or channels, the transmission terminal is the base station, the reception terminal is the first terminal and the second terminal, and the target terminal is the base station.

Then, through interaction among the base station, the first terminal and the second terminal, the base station may obtain the corresponding delay information. Specifically, an interaction process between the first terminal and the second terminal is as follows:

Step 800: the first terminal transmits the service A to be transmitted and the physical layer signal or channel carrying the clock reference information to base station, where the clock reference information represents reference arrival time of the service A to be transmitted to the second terminal.

In the embodiment of the present disclosure, the first terminal transmits the physical layer signal or channel carrying the clock reference information corresponding to the service A to be transmitted to the base station, the base station demodulates the physical layer signal or channel and obtains the clock reference information, and the base station is caused to configure a corresponding physical layer signal or channel based on the clock reference information.

Step 810: the base station receives the received service A to be transmitted and the physical layer signal or channel, demodulates the physical layer signal or channel, obtains the corresponding clock reference information, and configures configuration parameters such as the physical layer signal or channel carrying the clock reference information corresponding to the service A to be transmitted and a delay information feedback period.

In the embodiment of the present disclosure, based on the received service A to be transmitted and the received physical layer signal or channel that are transmitted by the first terminal, the base station demodulates the physical layer signal or channel, obtains the clock reference information corresponding to the service A to be transmitted, and configures configuration parameters such as the physical layer signal or channel carrying the clock reference information corresponding to the service A to be transmitted and a delay information feedback period.

Optionally, the base station may obtain the clock reference information corresponding to the service A to be transmitted based on the service A to be transmitted and the physical layer signal or channel that are directly transmitted by the first terminal, or transmit a corresponding obtaining request to the first terminal, and then obtain the clock reference information corresponding to the service A to be transmitted based on a response result from the first terminal.

Step 820: the base station transmits configuration parameters such as the service A to be transmitted, the physical layer signal or channel and the delay information feedback period to the second terminal.

In the embodiment of the present disclosure, the base station transmits the configuration parameters such as the service A to be transmitted, the physical layer signal or channel carrying the clock reference information corresponding to the service A to be transmitted and the delay information feedback period to the second terminal, where the second terminal feeds back the corresponding delay information to the base station based on the configuration parameter such as the delay information feedback period.

Optionally, the base station may further inform the second terminal of the configuration parameter such as the corresponding delay information feedback period through broadcasting, etc.

Step 830: the second terminal receives the physical layer signal or channel transmitted by the base station, demodulates the physical layer signal or channel, obtains the clock reference information, and determines corresponding delay information at least based on the clock reference information and actual arrival time of the physical layer signal or channel.

In the embodiment of the present disclosure, the second terminal receives the physical layer signal or channel transmitted by the base station, then demodulates the physical layer signal or channel, obtains the clock reference information of the service A to be transmitted, and subtracts the clock reference information from the actual arrival time of the physical layer signal or channel to obtain a corresponding delay measurement value, so that the second terminal determines the corresponding delay information.

Optionally, the delay measurement value may be positive, zero or negative.

Optionally, under the condition that the clock reference information is expressed as the delay budget, the reception terminal determines the corresponding delay information based on the clock reference information, the start transmission time of the physical layer signal or channel and the actual arrival time of the physical layer signal or channel in the operation mode above.

Optionally, the second terminal may further receive the service A to be transmitted or may not receive the service A to be transmitted, and in the case of timeout or channel condition, the second terminal may not receive the service A to be transmitted that is transmitted by the base station.

Step 840: the second terminal feeds back the delay information to the base station.

In the embodiment of the present disclosure, the second terminal feeds back the delay information to the base station based on the configuration parameter received such as the delay information feedback period.

Application Scenario 4

Figure 9:
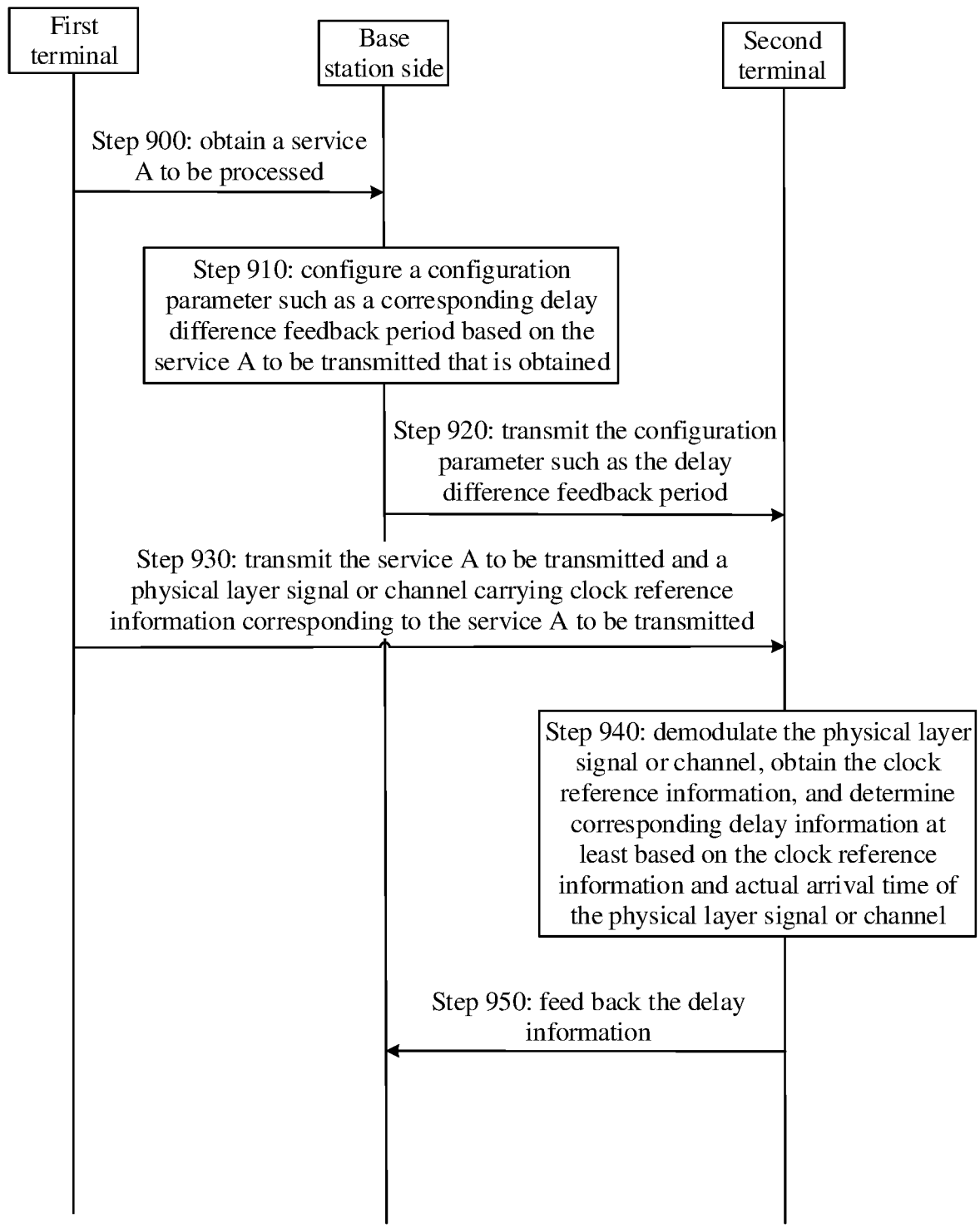
FIG. 9 is a schematic diagram of application scenario 4 in an embodiment of the present disclosure.

With reference to FIG. 9, it is assumed that a service A to be transmitted that needs to be transmitted to the second terminal exists in the first terminal, and the first terminal transmits the corresponding clock reference information through the preamble, the RS or other physical layer signals or channels, the transmission terminal is the first terminal, the reception terminal is the second terminal, and the target terminal is a base station.

Then, through interaction among the base station, the first terminal and the second terminal, the base station may obtain the corresponding delay information. Specifically, an interaction process among the base station, the first terminal and the second terminal is as follows.

Step 900: the base station obtains the service A to be transmitted, where the service A to be transmitted is transmitted to the base station by the first terminal, the service A to be transmitted contains the corresponding clock reference information, and the clock reference information represents reference arrival time of the service A to be transmitted to the second terminal.

In the embodiment of the present disclosure, the base station may obtain the corresponding service A to be transmitted based on the service A to be transmitted directly transmitted by the first terminal, or transmit a corresponding obtaining request to the first terminal, and then obtain the corresponding service A to be transmitted based on a response result from the first terminal.

Step 910: the base station configures a configuration parameter such as a corresponding delay information feedback period based on the service A to be transmitted that is obtained.

In the embodiment of the present disclosure, the base station configures the configuration parameter such as the corresponding delay information feedback period based on the service A to be transmitted that is obtained, and the second terminal feeds back the corresponding delay information to the base station based on the configuration parameter such as the delay information feedback period.

Step 920: the base station transmits the configuration parameter such as the delay information feedback period to the second terminal.

In the embodiment of the present disclosure, when the first terminal transmits the service A to be transmitted to the second terminal, the base station may transmit the configuration parameter configured such as the delay information feedback period to the second terminal, or inform the second terminal of the configuration parameter such as the corresponding delay information feedback period.

Step 930: the first terminal configures a physical layer signal or channel carrying clock reference information corresponding to the service A to be transmitted, and transmits the service A to be transmitted and the physical layer signal or channel to the second terminal.

In the embodiment of the present disclosure, the first terminal transmits the service A to be transmitted and the physical layer signal or channel to the second terminal, and the second terminal is caused to demodulate the physical layer signal or channel and obtain corresponding clock reference information.

Step 940: the second terminal demodulates the physical layer signal or channel, obtains the clock reference information, and determines corresponding delay information at least based on the clock reference information and actual arrival time of the physical layer signal or channel.

In the embodiment of the present disclosure, the second terminal receives the physical layer signal or channel transmitted by the first terminal, then demodulates the physical layer signal or channel, obtains the clock reference information of the service A to be transmitted, and subtracts the clock reference information from the actual arrival time of the physical layer signal or channel to obtain a corresponding delay measurement value, so that the second terminal determines the corresponding delay information.

Optionally, the delay measurement value may be positive, zero or negative.

Optionally, under the condition that the clock reference information is expressed as the delay budget, the reception terminal determines the corresponding delay information based on the clock reference information, the start transmission time of the physical layer signal or channel and the actual arrival time of the physical layer signal or channel in the operation mode above.

Optionally, the terminal may further receive the service A to be transmitted, and in the case of timeout or channel condition, the first terminal may not receive the service A to be transmitted that is transmitted by the base station.

Step 950: the second terminal feeds back the delay information to the base station.

In the embodiment of the present disclosure, the second terminal feeds back the delay information to the base station based on the configuration parameter received such as the delay information feedback period.

Application Scenario 5

Figure 10:
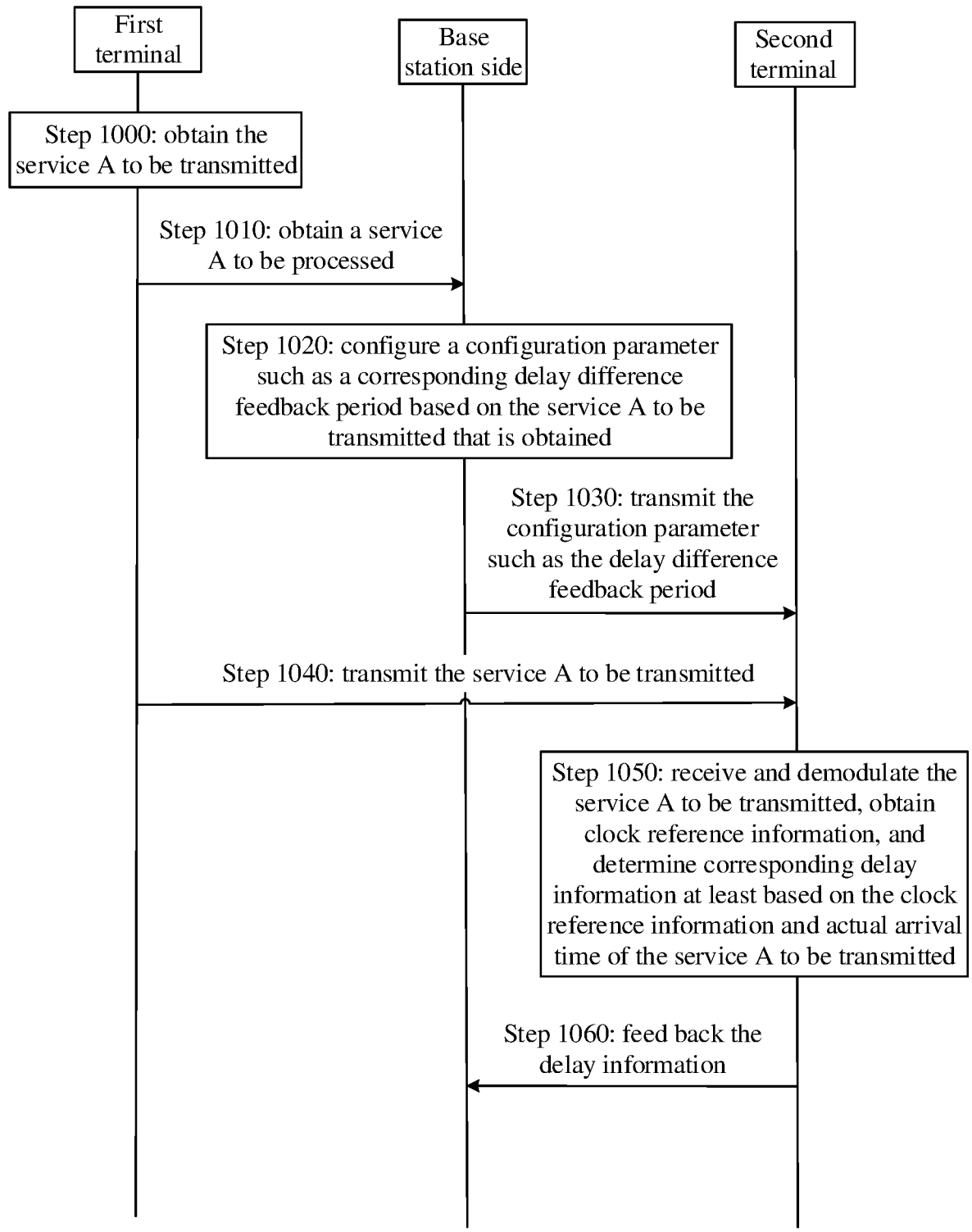
FIG. 10 is a schematic diagram of application scenario 5 in an embodiment of the present disclosure.

With reference to FIG. 10, it is assumed that a service A to be transmitted that needs to be transmitted to the second terminal exists in the first terminal, and the first terminal transmits the service A to be transmitted to the second terminal through a user plane, the transmission terminal is the first terminal, the reception terminal is the second terminal, and the target terminal is a base station.

Then, through interaction among the base station, the first terminal and the second terminal, the base station may obtain the corresponding delay information. Specifically, an interaction process among the base station, the first terminal and the second terminal is as follows.

Step 1000: the first terminal obtains the service A to be transmitted, where the service A to be transmitted carries clock reference information corresponding to the service A to be transmitted, and the clock reference information represents reference arrival time of the first service data packet of the service A to be transmitted to the second terminal and time interval information corresponding to periodic transmission to the second terminal of the service A to be transmitted by the first terminal.

In the embodiment of the present disclosure, since the service A to be transmitted that needs to be transmitted to the second terminal exists in the first terminal, the service A to be transmitted carries the clock reference information corresponding to the service A to be transmitted, and the clock reference information represents the reference arrival time of the first service data packet of the service A to be transmitted to the second terminal and the time interval information corresponding to periodic transmission to the second terminal of the service A to be transmitted by the first terminal.

Step 1010: the base station receives the service A to be transmitted, where the service A to be transmitted is transmitted to the base station by the first terminal.

In the embodiment of the present disclosure, the base station may obtain the corresponding service A to be transmitted based on the service A to be transmitted directly transmitted by the first terminal, or transmit a corresponding obtaining request to the first terminal, and then obtain the corresponding service A to be transmitted based on a response result from the first terminal.

Step 1020: the base station configures a configuration parameter such as a corresponding delay information feedback period based on the service A to be transmitted that is obtained.

In the embodiment of the present disclosure, the base station configures the configuration parameter such as the corresponding delay information feedback period based on the service A to be transmitted that is obtained, and the second terminal feeds back the corresponding delay information to the base station based on the configuration parameter such as the delay information feedback period.

Step 1030: the base station transmits the configuration parameter such as the delay information feedback period to the second terminal.

In the embodiment of the present disclosure, when the first terminal transmits the service A to be transmitted to the second terminal, the base station may transmit the configuration parameter configured such as the delay information feedback period to the second terminal, or inform, in a broadcast or other forms, the second terminal of the configuration parameter such as the corresponding delay information feedback period.

Step 1040: the first terminal transmits the service A to be transmitted to the second terminal.

In the embodiment of the present disclosure, the first terminal transmits the service A to be transmitted to the second terminal, so that the second terminal determines corresponding delay information based on the clock reference information and actual arrival time of the service A to be transmitted.

Step 1050: the second terminal receives the service A to be transmitted that is transmitted by the first terminal, demodulates the service A to be transmitted, obtains the clock reference information, and determines the corresponding delay information based on the clock reference information and the actual arrival time of the service A to be transmitted, where the service to be transmitted carries the clock reference information corresponding to the service to be transmitted.

In the embodiment of the present disclosure, the second terminal receives the service A to be transmitted that is transmitted by the first terminal and carries the clock reference information corresponding to the service A to be transmitted. The second terminal receives the service A to be transmitted that is transmitted by the first terminal, then demodulates the service A to be transmitted, obtains the clock reference information of the service A to be transmitted, and performs a corresponding operation on the clock reference information and the actual arrival time of the service A to be transmitted to obtain a corresponding delay measurement value, so that the second terminal determines the corresponding delay information.

Optionally, the corresponding operation performed by the second terminal on the clock reference information and the actual arrival time of the service A to be transmitted includes, but is not limited to, any one of two operations as follows.

1) The second terminal subtracts the reference arrival time to the second terminal of the first service data packet of the service A to be transmitted in the clock reference information from the actual arrival time of the service A to be transmitted.

Then, the corresponding delay information determined by the second terminal represents delay information corresponding to the first service data packet in the service to be transmitted.

2) The second terminal adds the reference arrival time to the second terminal of the first service data packet of the service A to be transmitted in the clock reference information to the time interval information corresponding to the periodic transmission of the service A to be transmitted by the first terminal, to obtain corresponding time information 1.

Then, the time information 1 is subtracted from the actual arrival time of the service A to be transmitted, and then the second terminal determines the corresponding delay information.

Then, the corresponding delay information determined by the second terminal may represent delay information corresponding to several selected service data packets in the service A to be transmitted, or may represent delay information corresponding to each service data packet in the service A to be transmitted.

Optionally, the delay measurement value may be positive, zero or negative.

Optionally, under the condition that the clock reference information is expressed as the delay budget, the reception terminal determines the corresponding delay information based on the clock reference information, the start transmission time of the service A to be transmitted and the actual arrival time of the service A to be transmitted in the operation mode above.

Step 1060: the second terminal feeds back the delay information to the base station.

In the embodiment of the present disclosure, the second terminal feeds back the delay information to the base station based on the configuration parameter received such as the delay information feedback period.

Figure 11:
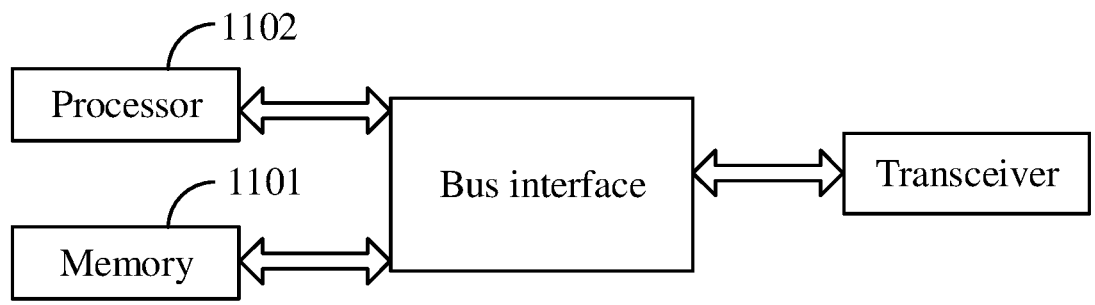
FIG. 11 is a schematic entity architecture diagram of a network device in an embodiment of the present disclosure.

Based on the same inventive concept, with reference to FIG. 11, a network device (for example, a transmission terminal) is provided according to an embodiment of the present disclosure. The network device at least includes: a memory 1101 configured to store an executable instruction; and a processor 1102 configured to read and execute the executable instruction stored in the memory 1101 and execute a process as follows: controlling a transmission terminal to configure, based on a service to be transmitted that is obtained, a physical layer signal or channel carrying clock reference information corresponding to the service to be transmitted, where the clock reference information represents reference arrival time of the service to be transmitted to a reception terminal; and controlling the transmission terminal to transmit the service to be transmitted and the physical layer signal or channel to the reception terminal, to cause the reception terminal to feed back delay information to a target terminal, where the delay information is determined by the reception terminal at least based on the clock reference information and actual arrival time of the physical layer signal or channel.

Optionally, the clock reference information corresponding to the service to be transmitted includes any one of expression forms as follows: an interval determined based on absolute time and a first allowable value corresponding to the service to be transmitted; an interval determined based on a subframe sequence number and a second allowable value corresponding to the service to be transmitted; or an interval determined based on a delay budget and a third allowable value corresponding to the service to be transmitted, where under the condition that the clock reference information is expressed as the delay budget, the physical layer signal or channel further carries start transmission time of the physical layer signal or channel, and the delay information is determined by the reception terminal based on the clock reference information, the start transmission time of the physical layer signal or channel and the actual arrival time of the physical layer signal or channel.

Optionally, the processor 1102 is configured to control the transmission terminal to transmit the service to be transmitted and the physical layer signal or channel to the reception terminal to cause the reception terminal to feed back delay information to a target terminal as follows: under the condition that the transmission terminal is a base station, the reception terminal is a terminal and the target terminal is the base station, controlling the transmission terminal to transmit configuration parameters such as the service to be transmitted, the physical layer signal or channel and a corresponding delay information feedback period to the reception terminal, to cause the reception terminal to feed back the delay information to the target terminal based on the configuration parameter such as the delay information feedback period; under the condition that the transmission terminal is a first terminal, the reception terminal is a second terminal and the target terminal is the first station, controlling the transmission terminal to transmit configuration parameters such as the service to be transmitted, the physical layer signal or channel and a corresponding delay information feedback period to the reception terminal, to cause the reception terminal to feed back the delay information to the target terminal based on the configuration parameter such as the delay information feedback period.

Optionally, the processor 1102 is configured to control the transmission terminal to transmit the service to be transmitted and the physical layer signal or channel to the reception terminal, to cause the reception terminal to feed back delay information to a target terminal as follows: under the condition that the transmission terminal is a base station, the reception terminal is a second terminal, the target terminal is the base station, the service to be transmitted is transmitted to the base station by the first terminal, and the clock reference information is obtained by demodulating through the base station the physical layer signal or channel transmitted by the first terminal, controlling the transmission terminal to transmit configuration parameters such as the service to be transmitted, the physical layer signal or channel and a corresponding delay information feedback period to the reception terminal, to cause the reception terminal to feed back the delay information to the target terminal based on the configuration parameter such as the delay information feedback period; under the condition that the transmission terminal is a first terminal, the reception terminal is a second terminal and the target terminal is a base station, controlling the transmission terminal to transmit the service to be transmitted and the physical layer signal or channel to the reception terminal, to cause the reception terminal to receive a configuration parameter such as a delay information feedback period transmitted by the target terminal and feed back the delay information to the target terminal based on the configuration parameter such as the delay information feedback period.

As shown in FIG. 11, a bus architecture may include any number of buses and any number of bridges that are interconnected, which are specifically linked together through various circuits of one or more processors represented by the processor 1102 and various circuits of memories represented by the memory 1101. The bus architecture may also link various other circuits such as a peripheral device, a voltage regulator, and a power management circuit, which is well known in the art, and therefore will not be further described herein. The bus interface provides an interface. A transceiver may include a plurality of elements, that is, the transceiver includes a transmitter and a receiver, and is used for providing a unit for being in communication with various other apparatuses on a transmission medium. The processor 1102 is responsible for managing the bus architecture and general processing, and the memory 1101 may store data used by the processor 1102 during an operation.

Figure 12:
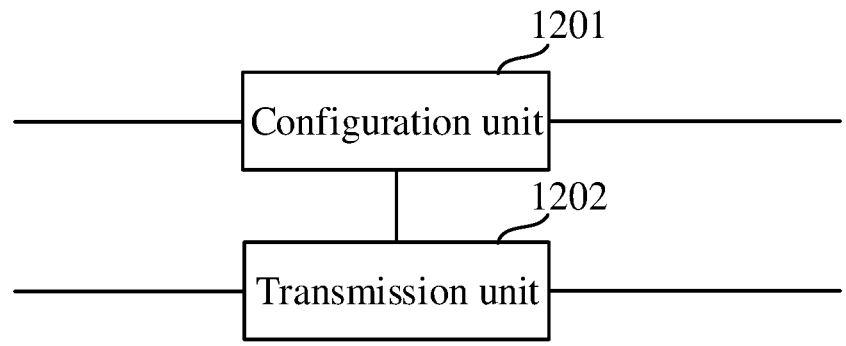
FIG. 12 is a schematic logic architecture diagram of a network device in an embodiment of the present disclosure.

Based on the same inventive concept, with reference to FIG. 12, a network device (such as a transmission terminal) is provided according to an embodiment of the present disclosure. The network device at least includes: a configuration unit 1201 and a transmission unit 1202.

The configuration unit 1201 is configured to configure, by a transmission terminal based on a service to be transmitted that is obtained, a physical layer signal or channel carrying clock reference information corresponding to the service to be transmitted, where the clock reference information represents reference arrival time of the service to be transmitted to a reception terminal.

The transmission unit 1202 is configured to transmit the service to be transmitted and the physical layer signal or channel to the reception terminal by the transmission terminal, to cause the reception terminal to feed back the delay information to a target terminal, where the delay information is determined by the reception terminal at least based on the clock reference information and actual arrival time of the physical layer signal or channel.

Optionally, the clock reference information corresponding to the service to be transmitted includes any one of expression forms as follows: an interval determined based on absolute time and a first allowable value corresponding to the service to be transmitted; an interval determined based on a subframe sequence number and a second allowable value corresponding to the service to be transmitted; or an interval determined based on a delay budget and a third allowable value corresponding to the service to be transmitted, where under the condition that the clock reference information is expressed as the delay budget, the physical layer signal or channel further carries start transmission time of the physical layer signal or channel, and the delay information is determined by the reception terminal based on the clock reference information, the start transmission time of the physical layer signal or channel and the actual arrival time of the physical layer signal or channel.

Optionally, the transmission unit 1202 is specifically configured to: under the condition that the transmission terminal is a base station, the reception terminal is a terminal and the target terminal is the base station, transmit configuration parameters such as the service to be transmitted, the physical layer signal or channel and a corresponding delay information feedback period to the reception terminal by the transmission terminal, to cause the reception terminal to feed back the delay information to the target terminal based on the configuration parameter such as the delay information feedback period; and under the condition that the transmission terminal is a first terminal, the reception terminal is a second terminal and the target terminal is the first station, transmit configuration parameters such as the service to be transmitted, the physical layer signal or channel and a corresponding delay information feedback period to the reception terminal by the transmission terminal, to cause the reception terminal to feed back the delay information to the target terminal based on the configuration parameter such as the delay information feedback period.

Optionally, the transmission unit 1202 is specifically configured to: under the condition that the transmission terminal is a base station, the reception terminal is a second terminal, the target terminal is the base station, the service to be transmitted is transmitted to the base station by the first terminal, and the clock reference information is obtained by demodulating through the base station the physical layer signal or channel transmitted by the first terminal, transmit configuration parameters such as the service to be transmitted, the physical layer signal or channel and a corresponding delay information feedback period to the reception terminal by the transmission terminal, to cause the reception terminal to feed back the delay information to the target terminal based on the configuration parameter such as the delay information feedback period; and under the condition that the transmission terminal is a first terminal, the reception terminal is a second terminal and the target terminal is a base station, transmit the service to be transmitted and the physical layer signal or channel to the reception terminal by the transmission terminal, to cause the reception terminal to receive a configuration parameter such as a delay information feedback period transmitted by the target terminal and feed back the delay information to the target terminal based on the configuration parameter such as the delay information feedback period.

In the embodiment of the present disclosure, the configuration unit 1201 and the transmission unit 1202 cooperate with each other to implement any method executed by the network device in each embodiment above.

Figure 13:
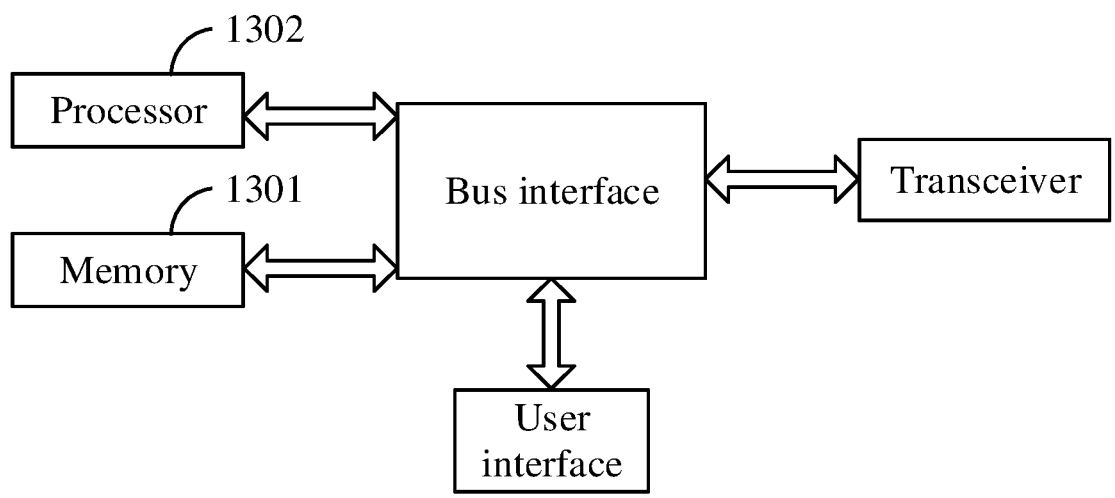
FIG. 13 is a schematic entity architecture diagram of a computer device in an embodiment of the present disclosure.

Based on the same inventive concept, with reference to FIG. 13, a computer device (for example, a reception terminal) is provided according to an embodiment of the present disclosure. The computer device at least includes: a memory 1301 configured to store an executable instruction; and a processor 1302 configured to read a program in the memory 1301 and execute a process as follows: controlling a reception terminal to receive a physical layer signal or channel that is transmitted by a transmission terminal and carries clock reference information corresponding to a service to be transmitted, where the clock reference information represents reference arrival time of the service to be transmitted to the reception terminal; controlling the reception terminal to demodulate the physical layer signal or channel, obtain the clock reference information, and determine corresponding delay information at least based on the clock reference information and actual arrival time of the physical layer signal or channel; and controlling the reception terminal to feed back the delay information to a target terminal.

Optionally, the clock reference information corresponding to the service to be transmitted includes any one of expression forms as follows: an interval determined based on absolute time and a first allowable value corresponding to the service to be transmitted; an interval determined based on a subframe sequence number and a second allowable value corresponding to the service to be transmitted; or an interval determined based on a delay budget and a third allowable value corresponding to the service to be transmitted, where under the condition that the clock reference information is expressed as the delay budget, the physical layer signal or channel further carries start transmission time of the physical layer signal or channel, and the delay information is determined based on the clock reference information, the start transmission time of the physical layer signal or channel and the actual arrival time of the physical layer signal or channel.

Optionally, the processor 1302 is configured to control the reception terminal to receive a physical layer signal or channel that is transmitted by a transmission terminal and carries clock reference information corresponding to a service to be transmitted as follows: under the condition that the transmission terminal is a base station, the reception terminal is a terminal and the target terminal is the base station, controlling the reception terminal to receive configuration parameters such as the physical layer signal or channel carrying the clock reference information corresponding to the service to be transmitted and a corresponding delay information feedback period transmitted by the transmission terminal.

The processor 1302 is configured to control the reception terminal to feed back the delay information to the target terminal as follows: controlling the reception terminal to feed back the corresponding delay information determined at least based on the clock reference information and the actual arrival time of the physical layer signal or channel to the target terminal based on the configuration parameter such as the delay information feedback period.

Optionally, the processor 1302 is configured to control the reception terminal to receive a physical layer signal or channel that is transmitted by a transmission terminal and carries clock reference information corresponding to a service to be transmitted as follows: under the condition that the transmission terminal is a first terminal, the reception terminal is a second terminal and the target terminal is the first terminal, controlling the reception terminal to receive configuration parameters such as the physical layer signal or channel carrying the clock reference information corresponding to the service to be transmitted and a corresponding delay information feedback period transmitted by the transmission terminal.

The processor 1302 is configured to control the reception terminal to feed back the delay information to a target terminal as follows: controlling the reception terminal to feed back the corresponding delay information determined at least based on the clock reference information and the actual arrival time of the physical layer signal or channel to the target terminal based on the configuration parameter such as the delay information feedback period.

Optionally, the processor 1302 is configured to control the reception terminal to receive a physical layer signal or channel that is transmitted by a transmission terminal and carries clock reference information corresponding to a service to be transmitted as follows: under the condition that the transmission terminal is a base station, the reception terminal is a second terminal, the target terminal is the base station, the service to be transmitted is transmitted to the base station by the first terminal, and the clock reference information is obtained by demodulating through the base station the physical layer signal or channel transmitted by the first terminal, controlling the reception terminal to receive configuration parameters such as the physical layer signal or channel carrying the clock reference information corresponding to the service to be transmitted and a corresponding delay information feedback period transmitted by the transmission terminal.

The processor 1302 is configured to control the reception terminal to feed back the delay information to a target terminal by the reception terminal as follows: controlling the reception terminal to feed back the corresponding delay information determined at least based on the clock reference information and the actual arrival time of the physical layer signal or channel to the target terminal based on the configuration parameter such as the delay information feedback period.

Optionally, the processor 1302 is configured control the reception terminal to receive a physical layer signal or channel that is transmitted by a transmission terminal and carries clock reference information corresponding to a service to be transmitted as follows: under the condition that the transmission terminal is a first terminal, the reception terminal is a second terminal and the target terminal is a base station, controlling the reception terminal to receive the physical layer signal or channel that is transmitted by the transmission terminal and carries the clock reference information corresponding to the service to be transmitted.

The processor 1302 is configured to control the reception terminal to feed back the delay information to a target terminal as follows: controlling the reception terminal to receive a configuration parameter such as a delay information feedback period transmitted by the target terminal, and feed back, based on the configuration parameter such as the delay information feedback period, the corresponding delay information determined at least based on the clock reference information and the actual arrival time of the physical layer signal or channel to the target terminal.

Optionally, the processor 1302 is configured to control the reception terminal to feed back the delay information to a target terminal as follows: controlling the reception terminal to feed back the delay information to the target terminal directly on an uplink subframe adjacent to a subframe on which the service to be transmitted is received; or, controlling the reception terminal to feed back the delay information to the target terminal according to a period for transmitting service data of the service to be transmitted by the transmission terminal; or, controlling the reception terminal to feed back the delay information to the target terminal based on a preset time interval, where the delay information is an average of corresponding delay information within the time interval; or, under the condition determining that the delay information reaches a preset delay threshold corresponding to the service to be transmitted, controlling the reception terminal to feed back the delay information to the target terminal.

As shown in FIG. 13, a bus architecture may include buses of any number and bridges of any number that are interconnected, which are specifically linked together through various circuits of one or more processors represented by the processor 1302 and various circuits of memories represented by the memory 1301. The bus architecture may also link various other circuits such as a peripheral device, a voltage regulator, and a power management circuit, which is well known in the art, and therefore will not be further described herein. The bus interface provides an interface. A transceiver may include a plurality of elements, that is, the transceiver includes a transmitter and a receiver, and is used for providing a unit for being in communication with various other apparatuses on a transmission medium. For different kinds of user equipment, the user plane may also be an interface that may be externally or internally connected to a necessary device including but not limited to a keypad, a display, a speaker, a microphone, a joystick, etc.

The processor 1302 is responsible for managing the bus architecture and general processing, and the memory 1301 may store data used, by the processor 1302 when the processor performs operation.

Figure 14:
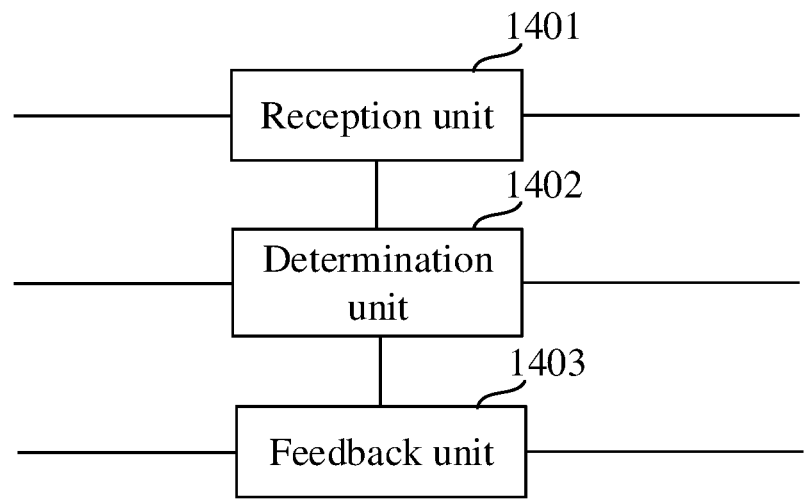
FIG. 14 is a schematic logic architecture diagram of a computer device in an embodiment of the present disclosure.

Based on the same inventive concept, with reference to FIG. 14, a computer device (for example, a reception terminal) is provided according to an embodiment of the present disclosure. The computer device at least includes: a reception unit 1401, a determination unit 1402 and a feedback unit 1403.

The reception unit 1401 is configured to receive, by a reception terminal, a physical layer signal or channel that is transmitted by a transmission terminal and carries clock reference information corresponding to a service to be transmitted, where the clock reference information represents reference arrival time of the service to be transmitted to the reception terminal.

The determination unit 1402 is configured to demodulate the physical layer signal or channel, obtain the clock reference information, and determine corresponding delay information at least based on the clock reference information and actual arrival time of the physical layer signal or channel by the reception terminal.

The feedback unit 1403 is configured to feed back the delay information to a target terminal by the reception terminal.

Optionally, the clock reference information corresponding to the service to be transmitted includes any one of expression forms as follows: an interval determined based on absolute time and a first allowable value corresponding to the service to be transmitted; an interval determined based on a subframe sequence number and a second allowable value corresponding to the service to be transmitted; or an interval determined based on a delay budget and a third allowable value corresponding to the service to be transmitted, where under the condition that the clock reference information is expressed as the delay budget, the physical layer signal or channel further carries start transmission time of the physical layer signal or channel, and the delay information is determined based on the clock reference information, the start transmission time of the physical layer signal or channel and the actual arrival time of the physical layer signal or channel.

Optionally, the reception unit 1401 is specifically configured to: under the condition that the transmission terminal is a base station, the reception terminal is a terminal and the target terminal is the base station, receive, by the reception terminal, configuration parameters such as the physical layer signal or channel carrying the clock reference information corresponding to the service to be transmitted and a corresponding delay information feedback period transmitted by the transmission terminal.

Optionally, the feedback unit 1403 is specifically configured to: feed back, by the reception terminal, the corresponding delay information determined at least based on the clock reference information and the actual arrival time of the physical layer signal or channel to the target terminal based on the configuration parameter such as the delay information feedback period.

Optionally, the reception unit 1401 is specifically configured to: under the condition that the transmission terminal is a first terminal, the reception terminal is a second terminal and the target terminal is the first terminal, receive, by the reception terminal, configuration parameters such as the physical layer signal or channel carrying the clock reference information corresponding to the service to be transmitted and a corresponding delay information feedback period transmitted by the transmission terminal.

Optionally, the feedback unit 1403 is specifically configured to: feed back, by the reception terminal, the corresponding delay information determined at least based on the clock reference information and the actual arrival time of the physical layer signal or channel to the target terminal based on the configuration parameter such as the delay information feedback period.

Optionally, the reception unit 1401 is specifically configured to: under the condition that the transmission terminal is a base station, the reception terminal is a second terminal, the target terminal is the base station, the service to be transmitted is transmitted to the base station by the first terminal, and the clock reference information is obtained by demodulating through the base station the physical layer signal or channel transmitted by the first terminal, receive, by the reception terminal, configuration parameters such as the physical layer signal or channel carrying the clock reference information corresponding to the service to be transmitted and a corresponding delay information feedback period transmitted by the transmission terminal.

Optionally, the feedback unit 1403 is specifically configured to: feed back, by the reception terminal, the corresponding delay information determined at least based on the clock reference information and the actual arrival time of the physical layer signal or channel to the target terminal based on the configuration parameter such as the delay information feedback period.

Optionally, the reception unit 1401 is specifically configured to: under the condition that the transmission terminal is a first terminal, the reception terminal is a second terminal and the target terminal is a base station, receive, by the reception terminal, the physical layer signal or channel that is transmitted by the transmission terminal and carries the clock reference information corresponding to the service to be transmitted.

Optionally, the feedback unit 1403 is specifically configured to: receive a configuration parameter such as a delay information feedback period transmitted by the target terminal, and feed back, based on the configuration parameter such as the delay information feedback period, the corresponding delay information determined at least based on the clock reference information and the actual arrival time of the physical layer signal or channel to the target terminal by the reception terminal.

Optionally, the feedback unit 1403 is specifically configured to: feed back the delay information to the target terminal by the reception terminal directly on an uplink subframe adjacent to a subframe on which the service to be transmitted is received; or, feed back the delay information to the target terminal by the reception terminal according to a period for transmitting service data of the service to be transmitted by the transmission terminal; or, feed back the delay information to the target terminal by the reception terminal based on a preset time interval, where the delay information is an average of corresponding delay information within the time interval; or, under the condition determining that the delay information reaches a preset delay threshold corresponding to the service to be transmitted, feed back the delay information to the target terminal by the reception terminal.

Figure 15:
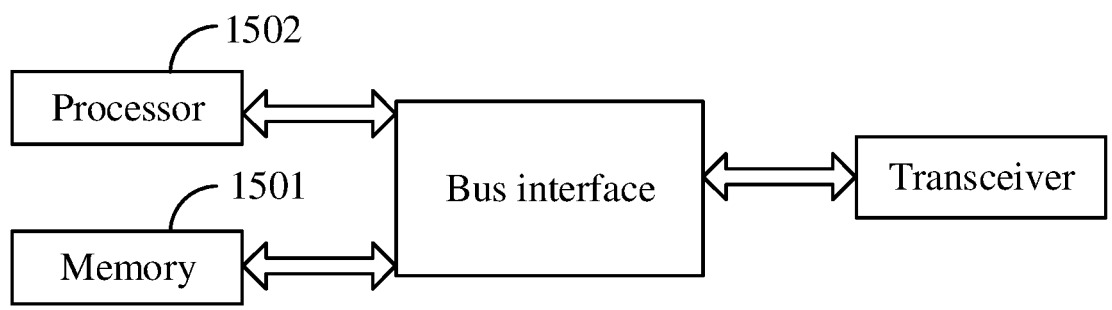
FIG. 15 is a schematic entity architecture diagram of a network device in an embodiment of the present disclosure.

Based on the same inventive concept, with reference to FIG. 15, a network device (for example, a transmission terminal) is provided according to an embodiment of the present disclosure. The network device at least includes: a memory 1501 configured to store an executable instruction; and a processor 1502 configured to read and execute the executable instruction stored in the memory 1501 and execute a process as follows: controlling a transmission terminal to obtain a service to be transmitted, where the service to be transmitted carries clock reference information corresponding to the service to be transmitted, and the clock reference information represents reference arrival time of the service to be transmitted to a reception terminal; and controlling the transmission terminal to transmit the service to be transmitted to the reception terminal by the transmission terminal, to cause the reception terminal to determine corresponding delay information at least based on the clock reference information and actual arrival time of the service to be transmitted.

Optionally, under the condition that the service to be transmitted is transmitted by the transmission terminal according to a preset period, the clock reference information represents reference arrival time of a first service data packet of the service to be transmitted to the reception terminal and time interval information corresponding to periodic transmission of the service to be transmitted by the transmission terminal.

Optionally, the clock reference information corresponding to the service to be transmitted includes any one of expression forms as follows: an interval determined based on absolute time and a first allowable value corresponding to the service to be transmitted; an interval determined based on a subframe sequence number and a second allowable value corresponding to the service to be transmitted; or an interval determined based on a delay budget and a third allowable value corresponding to the service to be transmitted, where under the condition that the clock reference information is expressed as the delay budget, the service to be transmitted further carries start transmission time of the service to be transmitted, and the delay information is determined by the reception terminal based on the clock reference information, the start transmission time of the service to be transmitted and the actual arrival time of the service to be transmitted.

Optionally, the delay information represents any type of information as follows: the delay information represents delay information corresponding to the first service data packet in the service to be transmitted; the delay information represents delay information corresponding to several preset first service data packets in the service to be transmitted; or the delay information represents delay information corresponding to each service data packet in the service to be transmitted.

Optionally, the processor 1502 is configured to control the transmission terminal to transmit the service to be transmitted to the reception terminal, to cause the reception terminal to determine corresponding delay information at least based on the clock reference information and actual arrival time of the service to be transmitted as follows: under the condition that the transmission terminal is a base station, the reception terminal is a terminal and the target terminal is the base station, controlling the transmission terminal to transmit configuration parameters such as the service to be transmitted and a corresponding delay information feedback period to the reception terminal, to cause the reception terminal to determine the corresponding delay information at least based on the clock reference information and the actual arrival time of the service to be transmitted.

Optionally, the processor 1502 is configured to control the transmission terminal to transmit the service to be transmitted to the reception terminal, to cause the reception terminal to determine corresponding delay information at least based on the clock reference information and actual arrival time of the service to be transmitted as follows: under the condition that the transmission terminal is a first terminal, the reception terminal is a second terminal and the target terminal is a base station, controlling the transmission terminal to transmit the service to be transmitted to the reception terminal, to cause the reception terminal to determine the corresponding delay information at least based on the clock reference information and the actual arrival time of the service to be transmitted.

Optionally, the processor 1502 is configured to control the transmission terminal to transmit the service to be transmitted to the reception terminal, to cause the reception terminal to determine corresponding delay information at least based on the clock reference information and actual arrival time of the service to be transmitted as follows: under the condition that the transmission terminal is a first terminal, the reception terminal is a second terminal and the target terminal is the first station, controlling the transmission terminal to transmit configuration parameters such as the service to be transmitted and a corresponding delay information feedback period to the reception terminal, to cause the reception terminal to determine corresponding delay information at least based on the clock reference information and actual arrival time of the service to be transmitted.

Optionally, the processor 1502 is configured to control the transmission terminal to transmit the service to be transmitted to the reception terminal, to cause the reception terminal to determine corresponding delay information at least based on the clock reference information and actual arrival time of the service to be transmitted as follows: under the condition that the transmission terminal is a terminal and the reception terminal is a base station, controlling the transmission terminal to transmit the service to be transmitted to the reception terminal, to cause the reception terminal to determine the corresponding delay information at least based on the clock reference information and the actual arrival time of the service to be transmitted.

As shown in FIG. 15, a bus architecture may include buses of any number and bridges of any number that are interconnected, which are specifically linked together through various circuits of one or more processors represented by the processor 1502 and various circuits of memories represented by the memory 1501. The bus architecture may also link various other circuits such as a peripheral device, a voltage regulator, and a power management circuit, which is well known in the art, and therefore will not be further described herein. The bus interface provides an interface. A transceiver may include a plurality of elements, that is, the transceiver includes a transmitter and a receiver, and is used for providing a unit for being in communication with various other apparatuses on a transmission medium. The processor 1502 is responsible for managing the bus architecture and general processing, and the memory 1501 may store data used, when performing operation, by the processor 1502.

Figure 16:
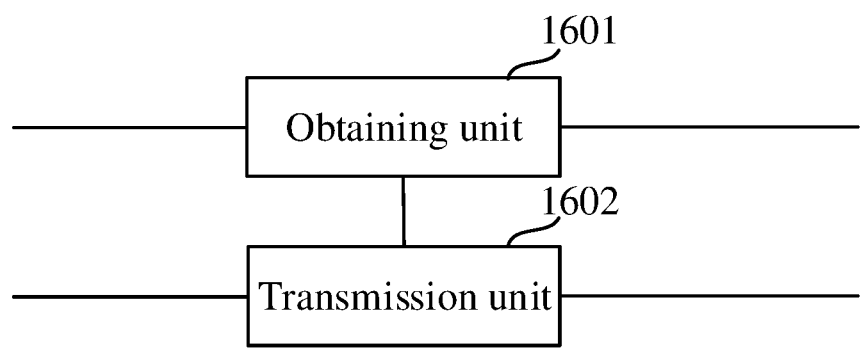
FIG. 16 is a schematic logic architecture diagram of a network device in an embodiment of the present disclosure.

Based on the same inventive concept, with reference to FIG. 16, a network device (such as a transmission terminal) is provided according to an embodiment of the present disclosure. The network device at least includes: an obtaining unit 1601 and a transmission unit 1602.

The obtaining unit 1601 is configured to obtain a service to be transmitted by a transmission terminal, where the service to be transmitted carries clock reference information corresponding to the service to be transmitted, and the clock reference information represents reference arrival time of the service to be transmitted to a reception terminal.

The transmission unit 1602 is configured to transmit the service to be transmitted to the reception terminal by the transmission terminal, to cause the reception terminal to determine corresponding delay information at least based on the clock reference information and actual arrival time of the service to be transmitted.

Optionally, under the condition that the service to be transmitted is transmitted by the transmission terminal according to a preset period, the clock reference information represents reference arrival time of a first service data packet of the service to be transmitted to the reception terminal and time interval information corresponding to periodic transmission of the service to be transmitted by the transmission terminal.

Optionally, the clock reference information corresponding to the service to be transmitted includes any one of expression forms as follows: an interval determined based on absolute time and a first allowable value corresponding to the service to be transmitted; an interval determined based on a subframe sequence number and a second allowable value corresponding to the service to be transmitted; or an interval determined based on a delay budget and a third allowable value corresponding to the service to be transmitted, where under the condition that the clock reference information is expressed as the delay budget, the service to be transmitted further carries start transmission time of the service to be transmitted, and the delay information is determined by the reception terminal based on the clock reference information, the start transmission time of the service to be transmitted and the actual arrival time of the service to be transmitted.

Optionally, the delay information represents any type of information as follows: the delay information represents delay information corresponding to the first service data packet in the service to be transmitted; the delay information represents delay information corresponding to several preset first service data packets in the service to be transmitted; or the delay information represents delay information corresponding to each service data packet in the service to be transmitted.

Optionally, the transmission unit 1602 is specifically configured to: under the condition that the transmission terminal is a base station, the reception terminal is a terminal and the target terminal is the base station, transmit configuration parameters such as the service to be transmitted and a corresponding delay information feedback period to the reception terminal by the transmission terminal, to cause the reception terminal to determine the corresponding delay information at least based on the clock reference information and the actual arrival time of the service to be transmitted.

Optionally, the transmission unit 1602 is specifically configured to: under the condition that the transmission terminal is a first terminal, the reception terminal is a second terminal and the target terminal is a base station, transmit the service to be transmitted to the reception terminal by the transmission terminal, to cause the reception terminal to determine the corresponding delay information at least based on the clock reference information and the actual arrival time of the service to be transmitted.

Optionally, the transmission unit 1602 is specifically configured to: under the condition that the transmission terminal is a first terminal, the reception terminal is a second terminal and the target terminal is the first station, transmit configuration parameters such as the service to be transmitted and a corresponding delay information feedback period to the reception terminal by the transmission terminal, to cause the reception terminal to determine corresponding delay information at least based on the clock reference information and actual arrival time of the service to be transmitted.

Optionally, the transmission unit 1602 is specifically configured to: under the condition that the transmission terminal is a terminal and the reception terminal is a base station, transmit the service to be transmitted to the reception terminal by the transmission terminal, to cause the reception terminal to determine the corresponding delay information at least based on the clock reference information and the actual arrival time of the service to be transmitted.

Figure 17:
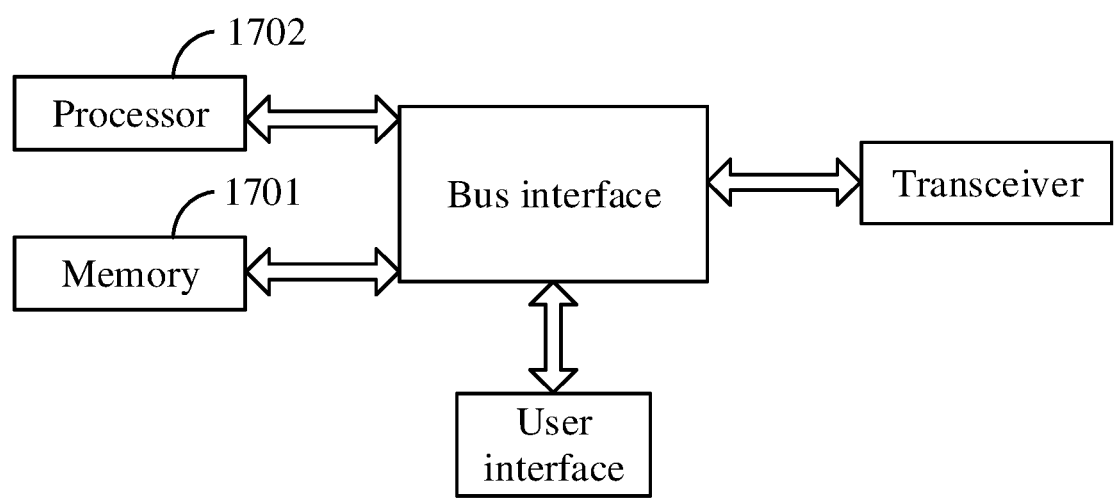
FIG. 17 is a schematic entity architecture diagram of a computer device in an embodiment of the present disclosure.

Based on the same inventive concept, with reference to FIG. 17, a computer device (for example, a reception terminal) is provided according to an embodiment of the present disclosure. The computer device at least includes: a memory 1701 configured to store an executable instruction; and a processor 1702 configured to read a program in the memory 1701 and execute a process as follows: controlling a reception terminal to receive a service to be transmitted that is transmitted by a transmission terminal, where the service to be transmitted carries clock reference information corresponding to the service to be transmitted, and the clock reference information represents reference arrival time of the service to be transmitted to the reception terminal; and controlling the reception terminal to demodulate the service to be transmitted, obtain the clock reference information, and determine corresponding delay information at least based on the clock reference information and actual arrival time of the service to be transmitted.

Optionally, under the condition that the service to be transmitted is transmitted by the transmission terminal according to a preset period, the clock reference information represents reference arrival time of a first service data packet of the service to be transmitted to the reception terminal and time interval information corresponding to periodic transmission of the service to be transmitted by the transmission terminal.

Optionally, the clock reference information corresponding to the service to be transmitted includes any one of expression forms as follows: an interval determined based on absolute time and a first allowable value corresponding to the service to be transmitted; an interval determined based on a subframe sequence number and a second allowable value corresponding to the service to be transmitted; or an interval determined based on a delay budget and a third allowable value corresponding to the service to be transmitted, where under the condition that the clock reference information is expressed as the delay budget, the service to be transmitted further carries start transmission time of the service to be transmitted, and the delay information is determined based on the clock reference information, the start transmission time of the service to be transmitted and the actual arrival time of the service to be transmitted.

Optionally, the delay information represents any type of information as follows: the delay information represents delay information corresponding to the first service data packet in the service to be transmitted; the delay information represents delay information corresponding to several preset first service data packets in the service to be transmitted; or the delay information represents delay information corresponding to each service data packet in the service to be transmitted.

Optionally, the processor 1702 is configured control the reception terminal to receive a service to be transmitted that is transmitted by a transmission terminal as follows: under the condition that the transmission terminal is a base station, the reception terminal is a terminal and the target terminal is the base station, controlling the reception terminal to receive configuration parameters such as the service to be transmitted and a corresponding delay information feedback period transmitted by the transmission terminal.

After the processor is configured to control the reception terminal to demodulate the service to be transmitted, obtain the clock reference information, and determine corresponding delay information at least based on the clock reference information and actual arrival time of the service to be transmitted, the processor 1702 is further configured to: control the reception terminal to feed back the corresponding delay information determined to the target terminal based on the configuration parameter such as the delay information feedback period.

Optionally, the processor 1702 is configured control the reception terminal to receive a service to be transmitted that is transmitted by a transmission terminal as follows: under the condition that the transmission terminal is a first terminal, the reception terminal is a second terminal and the target terminal is a base station, controlling the reception terminal to receive the service to be transmitted that is transmitted by the transmission terminal.

After the processor is configured to control the reception terminal to demodulate the service to be transmitted, obtain the clock reference information, and determine corresponding delay information at least based on the clock reference information and actual arrival time of the service to be transmitted, the processor 1702 is further configured to: control the reception terminal to receive a configuration parameter such as a delay information feedback period transmitted by the target terminal, and feed back the corresponding delay information determined to the target terminal based on the configuration parameter such as the delay information feedback period.

Optionally, the processor 1702 is configured control the reception terminal to receive a service to be transmitted that is transmitted by a transmission terminal as follows: under the condition that the transmission terminal is a first terminal, the reception terminal is a second terminal and the target terminal is the first terminal, controlling the reception terminal to receive configuration parameters such as the service to be transmitted and a corresponding delay information feedback period transmitted by the transmission terminal.

After the processor is configured to control the reception terminal to demodulate the service to be transmitted, obtain the clock reference information, and determine corresponding delay information at least based on the clock reference information and actual arrival time of the service to be transmitted, the processor 1702 is further configured to: control the reception terminal to feed back the corresponding delay information determined to the target terminal based on the configuration parameter such as the delay information feedback period.

Optionally, the processor 1702 is configured to control the reception terminal to feed back the corresponding delay information determined to the target terminal based on the configuration parameter such as the delay information feedback period as follows: controlling the reception terminal to feed back the delay information to the target terminal directly on an uplink subframe adjacent to a subframe on which the service to be transmitted is received; or, controlling the reception terminal to feed back the delay information to the target terminal according to a period for receiving the service to be transmitted; or, controlling the reception terminal to feed back the delay information to the target terminal based on a preset time interval, where the delay information is an average of corresponding delay information within the time interval; or, under the condition determining that the delay information reaches a preset delay threshold corresponding to the service to be transmitted, controlling the reception terminal to feed back the delay information to the target terminal.

Optionally, the processor 1702 is configured to control the reception terminal to receive a configuration parameter such as a delay information feedback period transmitted by the target terminal, and feed back the corresponding delay information determined to the target terminal based on the configuration parameter such as the delay information feedback period as follows: controlling the reception terminal to feed back the delay information to the target terminal directly on an uplink subframe adjacent to a subframe on which the service to be transmitted is received; or, controlling the reception terminal to feed back the delay information to the target terminal according to a period for receiving the service to be transmitted; or, controlling the reception terminal to feed back the delay information to the target terminal based on a preset time interval, where the delay information is an average of corresponding delay information within the time interval; or, under the condition determining that the delay information reaches a preset delay threshold corresponding to the service to be transmitted, controlling the reception terminal to feed back the delay information to the target terminal.

Optionally, the processor 1702 is configured to control the reception terminal to receive a configuration parameter such as a delay information feedback period transmitted by the target terminal, and feed back the corresponding delay information determined to the target terminal based on the configuration parameter such as the delay information feedback period as follows: controlling the reception terminal to feed back the delay information to the target terminal directly on an uplink subframe adjacent to a subframe on which the service to be transmitted is received; or, controlling the reception terminal to feed back the delay information to the target terminal according to a period for receiving the service to be transmitted; or, controlling the reception terminal to feed back the delay information to the target terminal based on a preset time interval, where the delay information is an average of corresponding delay information within the time interval; or, under the condition determining that the delay information reaches a preset delay threshold corresponding to the service to be transmitted, controlling the reception terminal to feed back the delay information to the target terminal.

Optionally, the processor 1702 is configured control the reception terminal to receive a service to be transmitted that is transmitted by a transmission terminal as follows: under the condition that the transmission terminal is a terminal and the reception terminal is a base station, controlling the reception terminal to receive the service to be transmitted that is transmitted by the transmission terminal.

After the processor is configured to control the reception terminal to demodulate the service to be transmitted, obtain the clock reference information, and determine corresponding delay information at least based on the clock reference information and actual arrival time of the service to be transmitted, the processor 1702 is further configured to: controlling the reception terminal to perform a corresponding operation based on the corresponding delay information determined.

As shown in FIG. 17, a bus architecture may include buses of any number and bridges of any number that are interconnected, which are specifically linked together through various circuits of one or more processors represented by the processor 1702 and various circuits of memories represented by the memory 1701. The bus architecture may also link various other circuits such as a peripheral device, a voltage regulator, and a power management circuit, which is well known in the art, and therefore will not be further described herein. The bus interface provides an interface. A transceiver may include a plurality of elements, that is, the transceiver includes a transmitter and a receiver, and is used for providing a unit for being in communication with various other apparatuses on a transmission medium. For different kinds of user equipment, the user plane may also be an interface that may be externally or internally connected to a necessary device including but not limited to a keypad, a display, a speaker, a microphone, a joystick, etc.

The processor 1702 is responsible for managing the bus architecture and general processing, and the memory 1701 may store data used, when performing operation, by the processor 1702.

Figure 18:
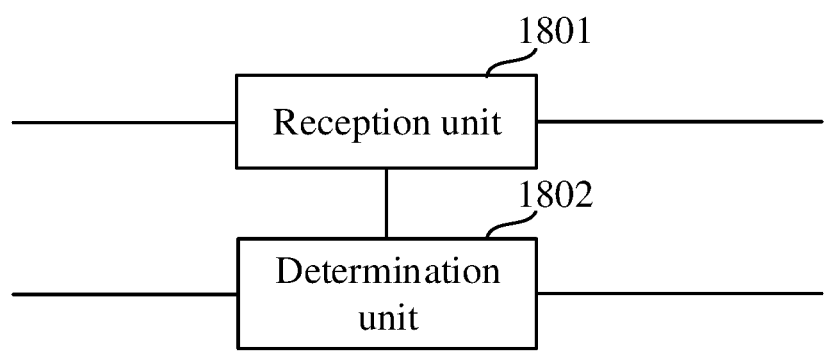
FIG. 18 is a schematic logic architecture diagram of a computer device according to an embodiment of the present disclosure.

Based on the same inventive concept, with reference to FIG. 18, a computer device (for example, a reception terminal) is provided according to an embodiment of the present disclosure. The computer device at least includes: a reception unit 1801 and a determination unit 1802.

The reception unit 1801 is configured to receive, by a reception terminal a service to be transmitted that is transmitted by a transmission terminal, where the service to be transmitted carries clock reference information corresponding to the service to be transmitted, and the clock reference information represents reference arrival time of the service to be transmitted to the reception terminal.

The determination unit 1802 is configured to demodulate the service to be transmitted, obtain the clock reference information, and determine corresponding delay information at least based on the clock reference information and actual arrival time of the service to be transmitted by the reception terminal.

Optionally, under the condition that the service to be transmitted is transmitted by the transmission terminal according to a preset period, the clock reference information represents reference arrival time of a first service data packet of the service to be transmitted to the reception terminal and time interval information corresponding to periodic transmission of the service to be transmitted by the transmission terminal.

Optionally, the clock reference information corresponding to the service to be transmitted includes any one of expression forms as follows: an interval determined based on absolute time and a first allowable value corresponding to the service to be transmitted; an interval determined based on a subframe sequence number and a second allowable value corresponding to the service to be transmitted; or an interval determined based on a delay budget and a third allowable value corresponding to the service to be transmitted, where under the condition that the clock reference information is expressed as the delay budget, the service to be transmitted further carries start transmission time of the service to be transmitted, and the delay information is determined based on the clock reference information, the start transmission time of the service to be transmitted and the actual arrival time of the service to be transmitted.

Optionally, the delay information represents any type of information as follows: the delay information represents delay information corresponding to the first service data packet in the service to be transmitted; the delay information represents delay information corresponding to several preset first service data packets in the service to be transmitted; or the delay information represents delay information corresponding to each service data packet in the service to be transmitted.

Optionally, the reception unit 1801 is specifically configured to: under the condition that the transmission terminal is a base station, the reception terminal is a terminal and the target terminal is the base station, receive, by the reception terminal, configuration parameters such as the service to be transmitted and a corresponding delay information feedback period transmitted by the transmission terminal.

Optionally, the determination unit 1802 is further configured to: feed back, by the reception terminal, the corresponding delay information determined to the target terminal based on the configuration parameter such as the delay information feedback period.

Optionally, the reception unit 1801 is specifically configured to: under the condition that the transmission terminal is a first terminal, the reception terminal is a second terminal and the target terminal is a base station, receive, by the reception terminal, the service to be transmitted that is transmitted by the transmission terminal.

Optionally, the determination unit 1802 is further configured to: receive a configuration parameter such as a delay information feedback period transmitted by the target terminal, and feed back the corresponding delay information determined to the target terminal based on the configuration parameter such as the delay information feedback period by the reception terminal.

Optionally, the reception unit 1801 is specifically configured to: under the condition that the transmission terminal is a first terminal, the reception terminal is a second terminal and the target terminal is the first terminal, receive, by the reception terminal, configuration parameters such as the service to be transmitted and a corresponding delay information feedback period transmitted by the transmission terminal.

Optionally, the determination unit 1802 is further configured to: feed back, by the reception terminal, the corresponding delay information determined to the target terminal based on the configuration parameter such as the delay information feedback period.

Optionally, the determination unit 1802 is specifically configured to: feed back the delay information to the target terminal by the reception terminal directly on an uplink subframe adjacent to a subframe on which the service to be transmitted is received; or, feed back the delay information to the target terminal by the reception terminal according to a period for receiving the service to be transmitted; or, feed back the delay information to the target terminal by the reception terminal based on a preset time interval, where the delay information is an average of corresponding delay information within the time interval; or, under the condition determining that the delay information reaches a preset delay threshold corresponding to the service to be transmitted, feed back the delay information to the target terminal by the reception terminal.

Optionally, the determination unit 1802 is specifically configured to: feed back the delay information to the target terminal by the reception terminal directly on an uplink subframe adjacent to a subframe on which the service to be transmitted is received; or, feed back the delay information to the target terminal by the reception terminal according to a period for receiving the service to be transmitted; or, feed back the delay information to the target terminal by the reception terminal based on a preset time interval, where the delay information is an average of corresponding delay information within the time interval; or, under the condition determining that the delay information reaches a preset delay threshold corresponding to the service to be transmitted, feed back the delay information to the target terminal by the reception terminal.

Optionally, the determination unit 1802 is specifically configured to: feed back the delay information to the target terminal by the reception terminal directly on an uplink subframe adjacent to a subframe on which the service to be transmitted is received; or, feed back the delay information to the target terminal by the reception terminal according to a period for receiving the service to be transmitted; or, feed back the delay information to the target terminal by the reception terminal based on a preset time interval, where the delay information is an average of corresponding delay information within the time interval; or, under the condition determining that the delay information reaches a preset delay threshold corresponding to the service to be transmitted, feed back the delay information to the target terminal by the reception terminal.

Optionally, the reception unit 1801 is specifically configured to: under the condition that the transmission terminal is a terminal and the reception terminal is a base station, receiving, by the reception terminal, the service to be transmitted that is transmitted by the transmission terminal.

Optionally, the determination unit 1802 is further configured to: perform a corresponding operation by the reception terminal based on the corresponding delay information determined.

Based on the same inventive concept, a computer-readable storage medium is provided according to an embodiment of the present disclosure. When an instruction in the computer-readable storage medium is executed by a processor, the processor may execute any method executed by the transmission terminal in each embodiment above.

Based on the same inventive concept, a computer-readable storage medium is provided according to an embodiment of the present disclosure. When an instruction in the computer-readable storage medium is executed by a processor, the processor may execute any method executed by the reception terminal in each embodiment above.

Based on the same inventive concept, a computer-readable storage medium is provided according to an embodiment of the present disclosure. When an instruction in the computer-readable storage medium is executed by a processor, the processor may execute any method executed by the transmission terminal in each embodiment above.

Based on the same inventive concept, a computer-readable storage medium is provided according to an embodiment of the present disclosure. When an instruction in the computer-readable storage medium is executed by a processor, the processor may execute any method executed by the reception terminal in each embodiment above.

To sum up, according to the embodiment of the present disclosure, the reception terminal receives the physical layer signal or channel that is transmitted by the transmission terminal and carries the clock reference information corresponding to the service to be transmitted, where the clock reference information represents the reference arrival time of the service to be transmitted to the reception terminal; and then, the reception terminal demodulates the physical layer signal or channel, obtains the clock reference information, and determines the corresponding delay information at least based on the clock reference information and the actual arrival time of the physical layer signal or channel, and then the reception terminal feeds back the delay information to the target terminal. In this way, a complete mechanism for measuring and feeding back delay information can be established, the reception terminal can determine the corresponding delay information in real time according to the physical layer signal and channel received, and then the target terminal can optimize queuing priority in a protocol stack or scheduling mechanism in real time based on the delay information fed back by the reception terminal, thereby solving the problems of scheduling congestion and a long terminal-to-terminal data transmission delay.

A person of ordinary skill in the art shall understand that the embodiment of the present disclosure can be provided in the form of a method, a system, or a computer program product. Therefore, the present disclosure can take the form of a full hardware embodiment, a full software embodiment, or an embodiment combining software and hardware. Moreover, the present disclosure may take the form of a computer program product implemented on one or more computer-usable storage media (including but not limited to a disk memory, a CD-ROM, an optical memory, etc.) including computer-usable program codes.

The present disclosure is described with reference to the flowcharts and/or block diagrams of the method, the device (system), and the computer program product according to the embodiments of the present disclosure. It should be understood that each flow and/or block in the flowchart and/or block diagram and a combination of the flow and/or block in the flowchart and/or block diagram may be implemented through computer program instructions. These computer program instructions may be provided for a processor of a general-purpose computer, a special-purpose computer, an embedded processing machine, or other programmable data processing device to produce a machine, such that instructions executed by the processor of the computer or other programmable data processing device generate an apparatus used for implementing a function specified in one or more flows of the flowchart and/or one or more blocks of the block diagram.

These computer program instructions may also be stored in a computer-readable memory that may guide the computer or other programmable data processing device to operate in a specific mode, such that the instructions stored in the computer-readable memory produce an article of manufacture including an instruction apparatus, and the instruction apparatus implements the function specified in one or more flows of the flowchart and/or one or more blocks in the block diagram.

These computer program instructions may further be loaded onto the computer or other programmable data processing device, such that a series of operation steps are executed on the computer or other programmable device to generate computer-implemented processing, and the instructions executed on the computer or other programmable device provide steps for implementing the function specified in the one or more flows of the flowchart and/or one or more blocks in the block diagram.

Although the preferred embodiments of the present disclosure have been described, additional alterations and modifications can be made to those embodiments by those skilled in the art once the basic inventive concept are learned. Therefore, the appended claims are intended to be constructed to include the preferred embodiments and all alterations and modifications that fall within the scope of the present disclosure.

Apparently, those skilled in the art can make various modifications and variations to the present disclosure without departing from the spirit and scope of the present disclosure. Thus, the present disclosure is intended to include such modifications and variations which fall within the scope of the appended claims of the present disclosure and their equivalents as well.

What is claimed is:

1. A method for measuring and feeding back delay information, comprising:

receiving, by a reception terminal, a physical layer signal or channel that is transmitted by a transmission terminal and carries clock reference information corresponding to a service to be transmitted, wherein the clock reference information represents reference arrival time of the service to be transmitted to the reception terminal;

demodulating, by the reception terminal, the physical layer signal or channel, obtaining, by the reception terminal, the clock reference information, and determining, by the reception terminal, corresponding delay information at least based on the clock reference information and actual arrival time of the physical layer signal or channel; and feeding back, by the reception terminal, the delay information to a target terminal.

2. The method according to claim 1, wherein the clock reference information corresponding to the service to be transmitted comprises any one of expression forms as follows:

an interval determined based on absolute time and a first allowable value corresponding to the service to be transmitted;

an interval determined based on a subframe sequence number and a second allowable value corresponding to the service to be transmitted; or an interval determined based on a delay budget and a third allowable value corresponding to the service to be transmitted, wherein under a condition that the clock reference information is expressed as the delay budget, the physical layer signal or channel further carries start transmission time of the physical layer signal or channel, and the delay information is determined based on the clock reference information, the start transmission time of the physical layer signal or channel and the actual arrival time of the physical layer signal or channel.

3. The method according to claim 2, wherein the receiving, by the reception terminal, the physical layer signal or channel that is transmitted by the transmission terminal and carries the clock reference information corresponding to the service to be transmitted comprises:

under a condition that the transmission terminal is a base station, the reception terminal is a terminal and the target terminal is the base station, or, under a condition that the transmission terminal is a first terminal, the reception terminal is a second terminal and the target terminal is the first terminal, or, under a condition that the transmission terminal is a base station, the reception terminal is a second terminal, the target terminal is the base station, the service to be transmitted is transmitted to the base station by the first terminal, and the clock reference information is obtained by demodulating through the base station the physical layer signal or channel transmitted by the first terminal, receiving, by the reception terminal, a configuration parameter transmitted by the transmission terminal, wherein the configuration parameter comprises the physical layer signal or channel carrying the clock reference information corresponding to the service to be transmitted and a corresponding delay information feedback period; and the feeding back, by the reception terminal, the delay information to the target terminal comprises:

feeding back, by the reception terminal, the delay information to the target terminal based on the delay information feedback period.

4. The method according to claim 2, wherein the receiving, by the reception terminal, the physical layer signal or channel that is transmitted by the transmission terminal and carries the clock reference information corresponding to the service to be transmitted comprises:

under a condition that the transmission terminal is a first terminal, the reception terminal is a second terminal and the target terminal is a base station, receiving, by the reception terminal, the physical layer signal or channel that is transmitted by the transmission terminal and carries the clock reference information corresponding to the service to be transmitted; and the feeding back, by the reception terminal, the delay information to the target terminal comprises:

after receiving, by the reception terminal, a delay information feedback period transmitted by the target terminal, feeding back, by the reception terminal, the delay information to the target terminal based on the delay information feedback period.

5. The method according to claim 1, wherein the feeding back, by the reception terminal, the delay information to a target terminal comprises:

feeding back, by the reception terminal, the delay information to the target terminal directly on an uplink subframe adjacent to a subframe on which the service to be transmitted is received; or, feeding back, by the reception terminal, the delay information to the target terminal according to a period for transmitting service data of the service to be transmitted by the transmission terminal; or, feeding back, by the reception terminal, the delay information to the target terminal based on a preset time interval, wherein the delay information is an average of corresponding delay information within the time interval; or, under a condition determining that the delay information reaches a preset delay threshold corresponding to the service to be transmitted, feeding back, by the reception terminal, the delay information to the target terminal.

6. The method according to claim 3, wherein the feeding back, by the reception terminal, the delay information to the target terminal based on the delay information feedback period comprises:

feeding back, by the reception terminal, the delay information to the target terminal directly on an uplink subframe adjacent to a subframe on which the service to be transmitted is received; or, feeding back, by the reception terminal, the delay information to the target terminal according to a period for receiving the service to be transmitted; or, feeding back, by the reception terminal, the delay information to the target terminal based on a preset time interval, wherein the delay information is an average of corresponding delay information within the time interval; or, under a condition determining that the delay information reaches a preset delay threshold corresponding to the service to be transmitted, feeding back, by the reception terminal, the delay information to the target terminal.

7. A computer device, comprising:

a memory, configured to store an executable instruction; and a processor, configured to read and execute the executable instruction stored in the memory and execute a process as follows:

controlling a reception terminal to receive a physical layer signal or channel that is transmitted by a transmission terminal and carries clock reference information corresponding to a service to be transmitted, wherein the clock reference information represents reference arrival time of the service to be transmitted to the reception terminal;

controlling the reception terminal to demodulate the physical layer signal or channel, obtain the clock reference information, and determine corresponding delay information at least based on the clock reference information and actual arrival time of the physical layer signal or channel; and controlling the reception terminal to feed back the delay information to a target terminal.

8. The computer device according to claim 7, wherein the clock reference information corresponding to the service to be transmitted comprises any one of expression forms as follows:

an interval determined based on absolute time and a first allowable value corresponding to the service to be transmitted;

an interval determined based on a subframe sequence number and a second allowable value corresponding to the service to be transmitted; or an interval determined based on a delay budget and a third allowable value corresponding to the service to be transmitted, wherein under a condition that the clock reference information is expressed as the delay budget, the physical layer signal or channel further carries start transmission time of the physical layer signal or channel, and the delay information is determined based on the clock reference information, the start transmission time of the physical layer signal or channel and the actual arrival time of the physical layer signal or channel.

9. The computer device according to claim 8, wherein the processor is configured to control the reception terminal to receive the physical layer signal or channel that is transmitted by the transmission terminal and carries the clock reference information corresponding to the service to be transmitted as follows:

under a condition that the transmission terminal is a base station, the reception terminal is a terminal and the target terminal is the base station, or, under a condition that the transmission terminal is a first terminal, the reception terminal is a second terminal and the target terminal is the first terminal, or, under a condition that the transmission terminal is a base station, the reception terminal is a second terminal, the target terminal is the base station, the service to be transmitted is transmitted to the base station by the first terminal, and the clock reference information is obtained by demodulating through the base station the physical layer signal or channel transmitted by the first terminal, controlling the reception terminal to receive a configuration parameter transmitted by the transmission terminal, wherein the configuration parameter comprises the physical layer signal or channel carrying the clock reference information corresponding to the service to be transmitted and a corresponding delay information feedback period; and the processor is configured to control the reception terminal to feed back the delay information to a target terminal as follows:

controlling the reception terminal to feed back the delay information to the target terminal based on the delay information feedback period.

10. The computer device according to claim 8, wherein the processor is configured to control the reception terminal to receive the physical layer signal or channel that is transmitted by the transmission terminal and carries the clock reference information corresponding to the service to be transmitted as follows:

under a condition that the transmission terminal is a first terminal, the reception terminal is a second terminal and the target terminal is a base station, controlling the reception terminal to receive the physical layer signal or channel that is transmitted by the transmission terminal and carries the clock reference information corresponding to the service to be transmitted; and the processor is configured to control the reception terminal to feed back the delay information to the target terminal as follows:

controlling the reception terminal, after the reception terminal receives a delay information feedback period transmitted by the target terminal, to feed back the delay information to the target terminal based on the delay information feedback period.

11. The computer device according to claim 7, wherein the processor is configured to feed back the delay information to a target terminal by the reception terminal as follows:

controlling the reception terminal to feed back the delay information to the target terminal directly on an uplink subframe adjacent to a subframe on which the service to be transmitted is received; or, controlling the reception terminal to feed back the delay information to the target terminal according to a period for transmitting service data of the service to be transmitted by the transmission terminal; or, controlling the reception terminal to feed back the delay information to the target terminal based on a preset time interval, wherein the delay information is an average of corresponding delay information within the time interval; or, under a condition determining that the delay information reaches a preset delay threshold corresponding to the service to be transmitted, controlling the reception terminal to feed back the delay information to the target terminal.

12. The computer device according to claim 9, wherein the processor is configured to control the reception terminal to feed back the delay information to the target terminal based on the delay information feedback period as follows:

controlling the reception terminal to feed back the delay information to the target terminal directly on an uplink subframe adjacent to a subframe on which the service to be transmitted is received; or, controlling the reception terminal to feed back the delay information to the target terminal according to a period for receiving the service to be transmitted; or, controlling the reception terminal to feed back the delay information to the target terminal based on a preset time interval, wherein the delay information is an average of corresponding delay information within the time interval; or, controlling the reception terminal to under a condition determining that the delay information reaches a preset delay threshold corresponding to the service to be transmitted, feed back the delay information to the target terminal.

\* \* \* \* \*